United States Patent
Aihara et al.

[11] Patent Number: 5,853,502
[45] Date of Patent: Dec. 29, 1998

[54] CARBURIZING STEEL AND STEEL PRODUCTS MANUFACTURED MAKING USE OF THE CARBURIZING STEEL

[75] Inventors: Kenji Aihara, Osaka; Yasuhide Fujioka, Wakayama; Kazuhiko Yoshida, Fukuroi; Tatsuhiro Goto; Akira Wakita, both of Iwata, all of Japan

[73] Assignees: Sumitomo Metal Industries, Ltd.; NTN Corporation, both of Osaka, Japan

[21] Appl. No.: 694,744

[22] Filed: Aug. 9, 1996

[30] Foreign Application Priority Data

Aug. 11, 1995 [JP] Japan ................................. 7-227382
Aug. 11, 1995 [JP] Japan ................................. 7-227383

[51] Int. Cl.$^6$ ............................. C23C 8/22; C22C 38/32
[52] U.S. Cl. ........................... 148/319; 148/233; 148/225
[58] Field of Search .................... 148/233, 225, 148/319

[56] References Cited

FOREIGN PATENT DOCUMENTS

| | | | |
|---|---|---|---|
| 57-70261 | 4/1982 | Japan | 148/319 |
| 60-238416 | 11/1985 | Japan | 148/233 |
| 2-170944 | 7/1990 | Japan | |
| 5-117806 | 5/1993 | Japan | |

*Primary Examiner*—Deborah Yee
*Attorney, Agent, or Firm*—Burns, Doane, Swecker & Mathis, LLP

[57] ABSTRACT

A carburizing steel having the following chemical composition:

C: 0.1 to 0.25%,
Si: 0.2 to 0.4%,
Mn: 0.3 to 0.9%,
P: 0.02% or less,
S: 0.001 to 0.15%,
Cr: 0.5 to 0.9%,
Mo: 0.15 to 1%,
Al: 0.01 to 0.1%,
B: 0.0005 to 0.009%,
N: less than 0.006%, and the balance of Fe and incidental impurities, wherein % is on a weight basis. Also disclosed are a method for the manufacture of the carburizing steel, parts of constant velocity universal joints for drive shafts made of the carburizing steel, as well as a method for the manufacture of such parts. The carburizing steel may further contain Ni: 0.3–4.0%, and one or more elements selected from the group consisting of Ti, Nb, V and Zr: 0.01–0.3% for each.

13 Claims, 6 Drawing Sheets

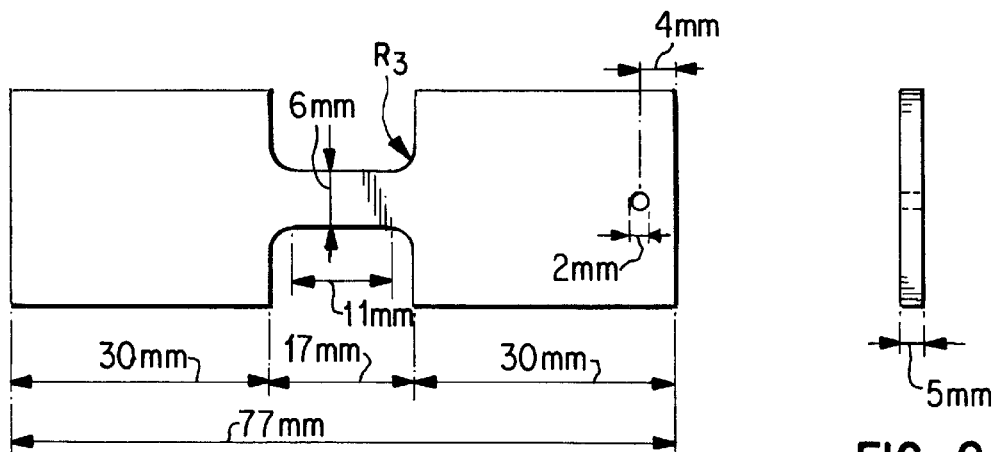
FIG. 8
FIG. 8a
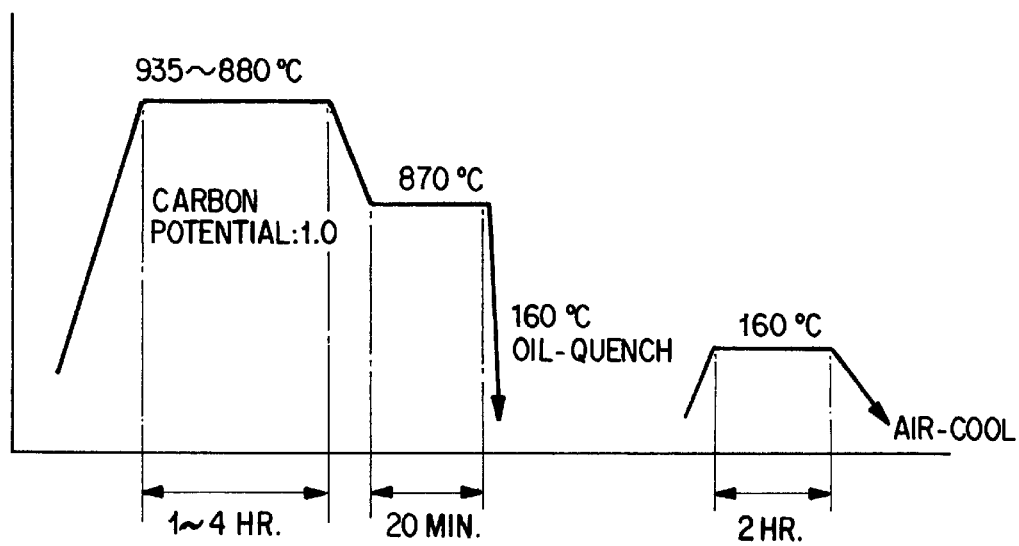
FIG. 9

CARBURIZING STEEL AND STEEL PRODUCTS MANUFACTURED MAKING USE OF THE CARBURIZING STEEL

FIELD OF THE INVENTION

The present invention relates to a carburizing steel which is used after being subjected to carburizing and quenching treatment, and to a method for the manufacture of steel pipe using the carburizing steel.

The invention also relates to members of constant velocity universal joints for drive shafts, which have excellent mechanical properties and which are manufactured using the carburizing steel, and to a method for the manufacture of the joint members.

DESCRIPTION OF THE RELATED ART

Carburizing steel is widely used as a material of machine parts which are used after their surfaces are subjected to carburizing and quenching. General characteristics required for the carburizing steel include the following:

1) to have excellent strength and toughness as a material (the steel itself before being subjected to carburizing and quenching treatment), as well as to have a good workability, and 2) to be easily carburized and quenched, and after these treatments, to exhibit excellent mechanical properties (toughness, strength, wear resistance, fatigue resistance, etc.).

Steels for machine structural use, such as Cr steels, Cr—Mo steels, Ni—Cr steels, and Ni—Cr—Mo steels, or more particularly, JIS SCr415, SCM415, SNC415 and SNCM415 have conventionally been used as carburizing steel. However, steel machine parts which are manufactured through subjecting to carburizing and quenching treatment have been used under severer conditions in recent years. Therefore, carburizing steel is desired to have not only conventionally required characteristics such as high surface hardness and bending fatigue resistance after being carburized and quenched, but also more excellent wear resistance, rolling contact fatigue resistance, enhanced fracture strength against impact application of loads, and toughness.

In particular, because many machine parts made of steel which are used after being carburized and quenched have configurations with notches at which stress concentrates, notch tensile strength after carburizing and quenching treatment, among other fracture strengths, becomes a critical consideration. On the other hand, in order to reduce costs for the manufacture of machine parts, it is also desired that the material itself be inexpensive and that the carburizing and quenching treatment require a shorter time. The aforementioned steels listed in JIS often fail to satisfy these desires.

Carburizing steel is sometimes supplied in the form of steel pipe. For example, ball cages of constant velocity universal joints for drive shafts, which will be described below, are manufactured using steel pipe made of carburizing steel. The steel pipe is normally manufactured by a pipe making process including a cold-drawing step to obtain a required dimensional accuracy, and an annealing step to improve workability of the pipe.

The steel pipe which must have excellent workability when processed into different product items, in addition to the above-mentioned material properties. In more detail, the pipe must exhibit excellent machinability when cut or punched, ensure prolonged service life of machine shop tools, not provide rough cut surfaces after being cut or punched, give enhanced dimensional accuracy, and cause reduced loading of grindstones when ground (i.e., good grindstone grindability).

Since these properties are greatly affected in a complicated fashion by the chemical composition and manufacture conditions of steel pipe, it is very difficult to consistently impart these properties to steel pipe. In particular, problems involved in carburizing steel are "coarsening of grains due to abnormal growth" which tends to occur during the carburizing and quenching treatment performed after the steel pipe has been processed into machine parts, and resultant "reduction in impact fracture strength" and "decrease in dimensional accuracy."

As described above, requirements that are desired to be met by carburizing steel have become severer. A description will be given of constant velocity universal joints for drive shafts, which are taken as an exemplified use of the carburizing steel.

As a joint which transmits power from a driving shaft to a driven shaft of the automobile, a joint so-called "Rzeppa Fixed Joint" as shown in FIG. 1 is commonly used. This joint has a structure in which a plurality of balls 5 (e.g., six balls) are inserted between an outer race 2 connected to a drive shaft 1 and an inner race 4 connected to a driven shaft 3, and the balls are held by a ball cage 6. The ball cage 6 and the inner race 4 function to transmit a significantly great nonstationary rotating force, and therefore, they must have enhanced toughness and strength against tensile loads of impact. Moreover, at surfaces where balls 5 are contacted, they must exhibit excellent wear resistance and rolling contact fatigue resistance.

Machine parts such as the above-described ball cages and inner races are made of carburizing steel because it is capable of being imparted with enhanced surface hardness and rolling contact fatigue resistance through carburizing and quenching treatment. As described above, carburizing steels conventionally employed are alloy steels such as SCr415, SCM415, SNC415, and SNCM415, all of which are listed in JIS. However, as performance standards of automobiles have been becoming upgraded, even higher levels of strength are demanded for constant velocity universal joints for drive shafts. Conventional carburizing steels standardized in JIS can no longer satisfactorily meet the mechanical strength requirements which are desired for constant velocity universal joints for drive shafts. Moreover, since competition regarding prices of products has become severer, reduction in costs in the manufacture of constant velocity universal joints for drive shafts is also strongly desired.

In order for the manufacturing costs of carburized steel products to be reduced, reduction in costs of carburizing and quenching treatment is required. An effective way to reduce treatment costs is to shorten the carburizing period by way of elevating the carburizing temperature. However, when the carburizing temperature is elevated, deformation generated during a quenching treatment after carburization is increased. Therefore, in the manufacture of machine parts which need dimension control at a high level of accuracy, carburizing temperature should not be raised. In addition, when the carburizing temperature is high, austenite grains grow abnormally during the carburizing treatment so as to form a metallographic structure including coarse grains, which deteriorates toughness of carburized machine parts and also invites reduction in strength such as impact fracture strength.

The present inventors have previously disclosed, as an improved carburizing steel capable of preventing grain boundaries from becoming brittle due to carburizing and quenching treatment, a high strength steel in which a small amount of B (boron) is added and the amounts of alloy components such as Cr, Mo, and Ni are properly determined (Japanese Patent Application Laid-Open (kokai) Nos. 2-170944 and 5-117806). However, this steel is still not satisfactory as a material of parts of constant velocity universal joints for drive shafts.

Generally speaking, when strength and wear resistance in carburized portions are enhanced, toughness decreases. As a result, resistance against impact loads becomes poor, thereby easily permitting fracture under low loads. Particularly in the case of machine parts having stress concentrated portions (i.e., notches) in surfaces, significant reduction in strength is observed after the machine parts have undergone a carburizing and quenching treatment. The above-mentioned B-added steel (the steel described in Japanese Patent Application Laid-Open (kokai) No. 5-117806, etc.) was invented in an attempt to solve this drawback and also to improve workability, and in fact addition of B brought about a remarkable improving effect. However, even when the B-added steel was used for the manufacture of parts of constant velocity universal joints for drive shafts, expected levels of impact load strength, wear resistance, and rolling contact fatigue resistance were not always obtained. In addition, the problem of shortening the carburizing time could not be sufficiently solved.

SUMMARY OF THE INVENTION

The primary object of the present invention is to provide carburizing steel having the following properties.

i. Good workability and a proper level of hardenability, as a material, i.e. before the steel is subjected to a carburizing and quenching treatment.

ii. Low carburizing temperature with shortened carburizing time.

iii. High strength; excellent toughness; impact fracture resistance; wear resistance; and rolling contact fatigue resistance being exhibited after carburizing and quenching treatment.

The second object of the present invention is to provide a method for the manufacture of steel pipe made of carburizing steel having the above-mentioned properties.

The third object of the present invention is to provide parts of constant velocity universal joints for drive shafts manufactured using the above-mentioned steel pipe, as well as a method for the production of the parts.

The carburizing steel of the present invention is characterized by having the following chemical composition (hereinafter % in chemical compositions indicates % by weight):

C: 0.1 to 0.25%,
Si: 0.2 to 0.4%,
Mn: 0.3 to 0.9%,
P: 0.02% or less,
S: 0.001 to 0.15%,
Cr: 0.5 to 0.9%,
Mo: 0.15 to 1%,
Al: 0.01 to 0.1%,
B: 0.0005 to 0.009%,
N: less than 0.006%, and
the balance of Fe and incidental impurities.

The carburizing steel of the present invention may further contain 0.3 to 4.0% of Ni in addition to the above described elements.

Also, the carburizing steel of the present invention may further contain one or more elements selected from the group consisting of Ti, Nb, V, and Zr; each in an amount of 0.01 to 0.3%.

The method for the manufacture of steel pipe of the present invention includes the steps of cold-working, with a percentage reduction in cross section of not more than 50%, steel pipe made of the above-mentioned carburizing steel, and annealing the resultant cold-worked pipe at a temperature ranging from 650° to 950° C.

The steel pipe is a seamless pipe manufactured in hot-working process or a welded pipe made of hot-rolled steel sheet or strip in forming and welding process.

The parts of constant velocity universal joints for drive shafts according to the present invention are produced using the above-described carburizing steel of the present invention, and are characterized by having a surface hardness (Hv) of 650–800, core hardness (Hv) of 250–450, and a carburized case depth of 0.2– 1.2 mm; all measured after the steel has undergone a carburizing and quenching treatment.

The method for the production of parts of constant velocity universal joints for drive shafts includes the following steps: subjecting a part manufactured using the above-described carburizing steel of the present invention to a carburizing treatment at a temperature between 880° and 930° C. for 1–3 hours, and quenching the carburized steel from a temperature between 800° and 870° C., thereby attaining a surface hardness (Hv) of 650–800, core hardness (Hv) of 250–450, and a carburized case depth of 0.2–1.2 mm.

BRIEF DESCRIPTION OF THE DRAWINGS

FIG. 8 depicts a square columnar tensile test piece used in examples.

FIG. 9 depicts a heat pattern showing conditions of carburizing, quenching, and annealing treatments performed in another example.

DETAILED DESCRIPTION OF THE INVENTION

Figure 1:
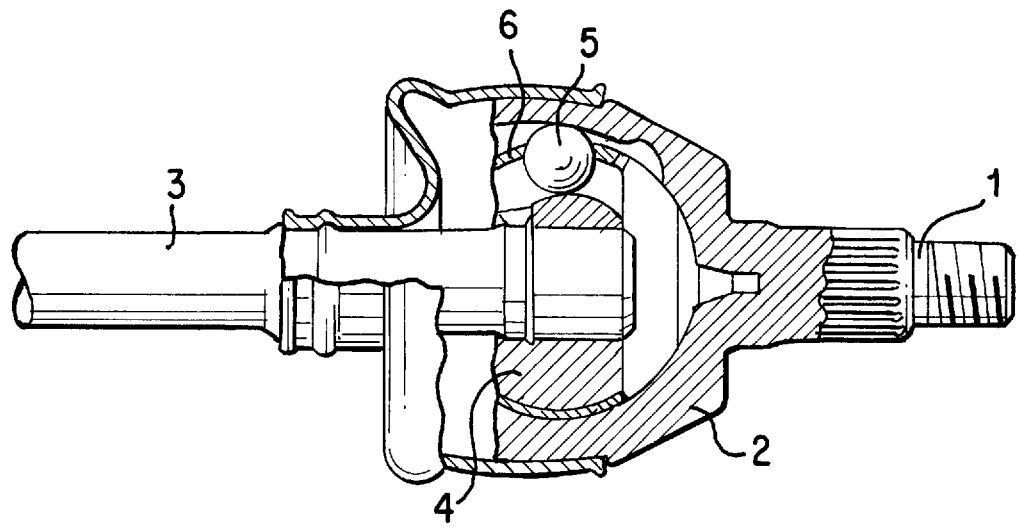
FIG. 1 is a partially sectioned side view of the "Rzeppa Fixed Joint" for a drive shaft having a ball cage and an inner race.

Conventional tempering temperature of case-hardened machine parts is around 180° to 200° C. Therefore, if quenching is performed in excess, toughness of the core portion is lost; whereas if quenching is insufficient, strength is lost. Thus, the chemical composition of carburizing steel must be designed so that the steel has a proper range of hardenability. Moreover, inclusion of elements that cause embrittlement of grain boundaries due to a carburizing treatment must be minimized, and addition of elements that improve grain boundary strength is necessary. This approach is effective for preventing intergranular fracture, which invites a reduction in strength against impact loads.

In recent years, in order to minimize deformation in an article which is to be subjected to a carburizing and quenching treatment, it has often been attempted to reduce the cooling rate during quenching by use of a special coolant oil or by raising the oil temperature. In such a case, a partially hardened non-martensitic structure tends to be formed if the carburized layer and the core of machine parts do not have sufficiently high hardenability.

It has been accepted in the art that the inherent problem involved in conventional carburizing steel; i.e., "failing to secure sufficient strength against impact loads, wear resistance, and rolling contact fatigue resistance" is caused by the mechanism in which an abnormally carburized layer resulting from a "grain boundary oxidation occurring during a carburizing treatment" reduces hardenability of steel in the vicinity of grain boundaries, and this reduction in hardenability results in the formation of the non-martensitic structure.

However, the present inventors found that "precipitation of carbides on austenite boundaries which are generated during quenching of a carburized material" has greater adverse effects as compared to the above-mentioned "grain boundary oxidation occurring during a carburizing treatment," and that it is in fact the latter phenomenon that is the true cause of the formation of the non-martensitic structure in surface portions of machine parts which are subjected to a carburizing and quenching treatment.

The inventors also found that the "precipitation of carbides on austenite boundaries which are generated during quenching of a carburized material" can be prevented by the addition of B in a predetermined amount.

Some of the B-added carburizing steels that have been proposed to date were designed to have reduced amounts of alloy elements in order to prevent grain boundary oxidation during carburizing treatment, and also in order to compensate the reduction in hardenability due to the reduction of alloy elements by the addition of B. However, the effect of B in improving hardenability decreases as the C content of the steel increases. Thus, B-added carburizing steels which are designed based on the idea of compensating loss of hardenability by the addition of B inevitably lose the effect of B in improving hardenability at surfaces thereof, where the C content is elevated due to a carburizing treatment. As a result, the carburized surface layer tends to form a non-martensitic structure, and this impedes the obtaining of a satisfactory carburizing steel having satisfactory strength against impact loads, wear resistance, and rolling contact fatigue resistance.

On the other hand, the above-mentioned problem; i.e., "loss of effect of B (which improves hardenability) at portions where the C content is increased compared to other portions by a carburizing treatment" is eliminated in B-added carburizing steels in which B is added based on the idea of preventing "precipitation of carbides on austenite boundaries which are generated during quenching of a carburized material", thereby suppressing the formation of the non-martensitic structure in the surface layer which has undergone a carburizing and quenching treatment. Such B-added carburizing steels, without being greatly affected by the C content in carburized portions, are capable of retaining the effect of B in improving strength against impact loads, wear resistance, and rolling contact fatigue resistance.

However, in order to secure the effect of B to prevent carbides from precipitating on austenite boundaries which are generated during quenching of a carburized material, it is essential that the N content in the steel be reduced to a specific range. The present inventors confirmed that, even when N is contained in steel in an amount of up to 0.007% (about the lower limit in conventional carburizing steels), it is still difficult to consistently retain the above-mentioned effect of B (i.e., to prevent carbides from precipitating on austenite boundaries which are generated during quenching of a carburized material), and that when the N content in steel is reduced to a level of lower than 0.006%, the above-mentioned effect of B becomes significant, thereby improving strengths of steels including strength against impact loads as well as toughness.

Moreover, the present inventors also found that when the N content in steel is reduced to less than 0.006%, rolling contact fatigue resistance is significantly improved. It was previously considered that rolling contact fatigue resistance is deteriorated by TiN, because Ti is always added to conventional B-added carburizing steels. However, the present inventors now have clarified that even in steels in which Ti has not been added, the presence of N adversely affects the rolling contact resistance, and that this adverse effect can be substantially eliminated by limiting the N content to less than 0.006%.

If properties of carburizing steel are improved by the above-described approaches, there arises the following new problem. That is, when steel pipe is produced using such a carburizing steel as a material steel in the conventional process including cold-drawing, and annealing, various drawbacks are significant; including insufficient machinability, coarsening of grains attributed to abnormal growth of grains when a carburizing and quenching treatment is undertaken after the steel pipe is processed into machine parts, and resultant reduction in strength against impact fracture as well as deterioration of dimensional accuracy. Particularly in the manufacture of a ball cage of a constant velocity universal joint for a drive shaft as shown in FIG. 1, its intermediate material, i.e., steel pipe, is punched and the surface created by punching comes to serve as a ball rolling surface. Therefore, the roughness of the rolling surface greatly affects the service life of the ball cage. Accordingly, poor machinability of steel pipe, which is a material of such machine parts, must be improved.

The present inventors clarified that the above-mentioned drawbacks in terms of machinability and properties of steel pipe made of carburizing steel tend to be caused by an excessively fine microcrystalline structure (particularly grain size of ferrite and that of carbides) of steel pipe, and that the degree of working during cold-drawing in a pipe-making process and annealing conditions are responsible for formation of the microcrystalline structure of the resultant steel pipe. Based on this finding, the inventors established a manufacturing method in which the above drawbacks are eliminated by selecting the proper degree of working during cold-drawing as well as proper annealing conditions.

Hereinafter, detailed descriptions will be given of the carburizing steel of the present invention and a method for the manufacture of steel pipe by the use of the carburizing steel, as well as parts of constant velocity universal joints for drive shafts of the present invention and a method for the production thereof.

I. Carburizing Steel and Method for the Manufacture of Steel Pipe Using the Carburizing Steel i) Reasons Why the Chemical Composition of the Carburizing Steel of the Present Invention is Determined as Described Above C: C is an essential component that secures hardness and strength of steel. In order for the steel to have sufficient strength that does not permit deformation during use of carburized and quenched machine parts made of the steel, a hardness of not less than Hv 250 must be imparted to the steel. In order to attain this level of hardness, the C content is required to be not less than 0.1%. However, if the C content in steel is in excess of 0.25%, a machine part made of such steel has deteriorated toughness in its core portion. Therefore, the C content is determined to fall in the range from 0.1 to 0.25%.

Si: Conventionally, the Si content in carburizing steel has often been limited as the element Si was considered to cause brittleness of grain boundaries as a result of grain boundary oxidation occurring during carburizing. However, the present invention takes advantage of the effect of Si in improving hardenability so as to ensure the hardenability of the carburized layer and to thereby attain enhanced strength against impact fracture. When the Si content is less than 0.2%, a desired hardenability of the carburized layer cannot be obtained, whereas when it is in excess of 0.4%, the phenomenon of "embrittlement due to oxidation of Si occurring in the vicinity of grain boundaries during carburization" becomes significant. Therefore, the Si content is determined to be between 0.2 and 0.4%.

Mn: Similar to Si, addition of Mn is often reduced in order to prevent embrittlement of grain boundaries caused by oxidation of grain boundaries during carburization. However, when the amount of Mn is reduced, hardenability of the carburized layer deteriorates considerably, making it difficult to secure a high level of strength against impact fracture. In other words, when the Mn content in the steel of the present invention is less than 0.3%, an intended hardenability of the carburized layer cannot be secured. It was found that the phenomenon of embrittlement caused by oxidation of Mn in the vicinity of grain boundaries during a carburizing treatment raises practically no problems, even when the Mn content is in excess of 0.9%. However, when the Mn content is in excess of 0.9%, punching-workability and grindability on grindstones deteriorate considerably. Therefore, the Mn content is determined to fall in the range from 0.3 to 0.9%.

P: Because P accelerates embrittlement of grain boundaries as a result of precipitation of cementite on austenite grain boundaries during a carburizing treatment, P is a very harmful impurity in carburizing steel. Accordingly, the P content is preferably as low as possible. However, since a reduction in P content invites an increase of costs in selecting starting materials and smelting, the allowable range for P is determined so as to balance the target performance and costs. In the present invention, the upper limit of P content is determined to be 0.02% in consideration of the effect of B, which will be described herein below.

S: S invites deterioration in toughness of steel. Nonetheless, S is desired to be positively added to steel for improving machine-processability, i.e. machinability and punching-workability. When the S content is less than 0.001%, the effect of S in improving machine-processability is not prominent, whereas when the S content is in excess of 0.15%, toughness of the steel deteriorates considerably. Therefore, the S content is determined to be from 0.001 to 0.15%. However, if a high level of machine-processability is not required, it is advisable that the content of S be limited to a relatively low level.

Cr: Cr is an indispensable element for securing hardenability of steel matrix and carbon concentration of a carburized layer within a short period of carburizing treatment. Not less than 0.5 % of Cr is necessary to obtain the above-mentioned effects.

On the other hand, Cr significantly accelerates embrittlement of grain boundaries caused by precipitation of cementite on austenite grain boundaries when a carburizing and quenching treatment is performed. Therefore, the Cr content must be limited to 0.9% or less. When the upper limit of Cr content is thus determined, hardenability of steel, particularly hardenability in carburized portions with a high C content, becomes poor. In the present invention, this disadvantage is compensated by the addition of B, Mo, and, if necessary, Ni, which do not invite embrittlement of grain boundaries. For these reasons, the Cr content is determined to be from 0.5% to 0.9%. Preferably, it is between 0.5 and 0.65%.

Mo: Mo is an indispensable element to improve strength and toughness of steel in its matrix and carburized portions, and to elevate the carbon concentration of the carburized layer within a short period of carburizing treatment. The effect of Mo to improve hardenability, as it is scarcely affected by the amount of C in the matrix of steel, is consistently exhibited even in carburized portions having a high C content.

When steel is treated to reduce the amount of C so as to prevent the steel from becoming embrittled due to a carburizing treatment and to compensate hardenability by the addition of B, its hardenability significantly deteriorates even in portions having a high C content. In such a case, compensation, by Mo, of hardenability in carburized portions are critical; if the Mo content is less than 0.15%, hardenability cannot be satisfactorily compensated, and in addition, less amounts of C can be transferred to steel by a short-term treatment. From the standpoint of obtaining the above-mentioned effects, higher amounts of Mo are preferred. However, since up to 1% of addition provides sufficient effects, addition in amounts greater then 1% is not economical. Therefore, the Mo content is determined to fall in the range from 0.15% to 1%.

Al: Al is an element that is effective for the deoxidation of steel and the reduction in size of grains. When the Al content is less than 0.01%, such effects are not sufficient. On the other hand, when the Al content is in excess of 0.1%, amounts of inclusions which are harmful to toughness increase. For this reason, the Al content is determined to fall within a range between 0.01% and 0.1%.

B: B prevents precipitation, in austenite boundaries, of carbides (Cr carbide, etc.) which are produced when a carburized steel is quenched, to thereby prevent formation of the non-martensitic structure in carburized portions and embrittlement of grain boundaries. Due to this feature, B is an indispensable element for providing carburized and quenched steel with sufficient strength against impact loads, wear resistance, and rolling contact fatigue resistance.

In the present invention, the Cr content is limited in order to minimize adverse effects of Cr, i.e., significant "acceleration of embrittlement of grain boundaries caused by carbides precipitating in grain boundaries during a carburizing and quenching treatment". The limited or reduced Cr content invites a "reduction in hardenability of steel matrix". B functions to compensate the thus-deteriorated hardenability of steel matrix, and to ensure hardenability of the core portion of the steel. However, if the B content is less than 0.0005%, the above-described advantageous effects of B cannot be obtained. On the other hand, if B is present in an amount in excess of 0.009%, B adversely functions to cause embrittlement of grain boundaries. Therefore, the B content is determined to be between 0.0005% and 0.009%.

It should however be noted that, as described above, even when B is added to steel so as to prevent precipitation of carbides in grain boundaries attributed to a carburizing and quenching treatment, the above-described effects of B may not be sufficiently ensured if the N content is in a conventional level, i.e., as much as 0.007%.

N: As described above, N present in steel exerts a great influence on the function of B. That is, it is only when the N content in steel is reduced to less than 0.006% that the effect of B, i.e., "prevention of carbides from precipitating in grain boundaries of carburized steel occurring during a carburizing and quenching treatment", becomes significant, thereby ensuring a sufficient strength against impact loads and remarkably improving the rolling contact fatigue resistance. Therefore, it is preferred that the N content be as small as possible.

Ni: When the steel of the present invention is used as an inner race or a ball cage of a constant velocity universal joint for a drive shaft incorporated in automobiles, sufficient levels of strength and toughness are obtained even when Ni or the below-described "at least one of Ti, Nb, V, or Zr" is not added. However, if use under considerably severe conditions is expected, it is advantageous to add one or more of these elements. Ni is an element which effectively improves the strength and toughness of the matrix of steel. Moreover, Ni cooperates with Mo to improve the strength and toughness of carburized portions of steel. However, if the Ni content is less than 0.3%, sufficient effects cannot be obtained, whereas if it is in excess of 4.0%, its effects saturate to only increase material costs. Therefore, when Ni is added, its content is preferably between 0.3% and 4.0% inclusive.

Ti, Nb, V, and Zr:

These elements function to reduce the size of grains of steel to thereby enhance the toughness of the steel. Thus, it is preferred that one or more of these elements be added in cases where use under severe conditions is expected. However, if the amount of any one of these elements is less than 0.01%, the above-mentioned effects are not satisfactory; whereas if in excess of 0.3%, toughness and rolling contact fatigue resistance are adversely affected. Therefore, the proper range for these elements is between 0.01% and 0.3% inclusive for each element.

ii) Manufacturing Conditions of Steel Pipe Using the Carburizing Steel of the Present Invention (A) Degree of cold working after hot pipe-making Steel pipe is manufactured by piercing a billet and then hot-rolling or hot-extruding the resulting hollow shell, or by forming and welding a steel sheet or strip. In the manufacture of steel pipe using carburizing steel, a further step of cold working, such as cold-drawing, is performed so as to obtain a predetermined dimension or dimensional accuracy. According to the manufacturing method of the present invention, the percentage reduction in sectional area during the cold working is limited to 50% or less. If this upper limit is surpassed, accumulation of strain in the matrix of steel increases, to thereby invite abnormal growth of austenitic grains in the subsequent carburizing treatment. As a result, the hardened structure is coarsened and the carburized layer becomes to be a "structure including coarse grains." On the other hand, if the degree of cold working is in excess of 50%, the resulting steel pipe becomes significantly hardened due to the work hardening phenomenon, making it difficult to soften the structure by subsequent annealing. As a result, the steel pipe has poor processability, to cause not only a deteriorated dimensional accuracy when it is punched but also shortened service life of machining tools. Therefore, the degree of cold working must be limited to not more than 50%.

(B) Temperature during annealing

The steel pipe which has undergone the above-described cold working is subjected to annealing. If the annealing temperature is lower than 650° C., the aforementioned accumulation of strain in the matrix of steel during cold working is not sufficiently released. This results in an elevated hardness of the steel pipe, and deteriorates properties regarding punching-workability. Moreover, in a subsequent carburizing treatment, austenite grains tend to grow abnormally, inviting poor resistance against impact loads and against rolling contact fatigue. On the other hand, if the annealing temperature is in excess of 950° C., austenite grains abnormally grow during annealing to render the metallographic structure to include coarse grains, which propagate further in a subsequent carburizing treatment. Thus, also in this case, resistance against impact loads and resistance against rolling contact fatigue become poor.

II. Parts of Constant Velocity Universal Joints for Drive Shafts and the method for the manufacture thereof i) Hardness Distribution in the Sectional Area of Machine Part Among parts of constant velocity universal joints for drive shafts, inner races and ball cages are typical main parts that are manufactured through carburizing and quenching. When rotary forces of impact are applied to joints, it often happens that the surface portions of the joints are chipped off, as these portions are somewhat embrittled due to cementation. As a result, smooth movement of joints is impeded. In the case of parts made of carburizing steel of the present invention, chipping occurs when the surface hardness after carburizing and quenching is in excess of Hv 800. Also, the columnar portions of frames of ball cages become to have a reduced tensile strength of impact and thus are not proper for use as joint parts when the surface hardness is in excess of Hv 800.

On the other hand, if the surface hardness of parts after carburizing and quenching is lower than Hv 650, resistance against rolling contact fatigue deteriorates. Therefore, for high strength joint parts which are used under higher surface pressure as compared to conventional situations, resistance against rolling contact fatigue is insufficient.

For the reasons described above, the surface hardness of parts of constant velocity universal joints for drive shafts is determined between Hv 650 and Hv 800 inclusive.

When the carburized case depth after a carburizing and quenching treatment is less than 0.2 mm, resistance against rolling contact fatigue is insufficient for high strength joint parts which are used under higher surface pressure as compared to conventional situations. On the other hand, when this depth is in excess of 1.2 mm, machine parts become to have a reduced tensile strength of impact, making themselves improper for the end use of high strength joint parts. Therefore, the carburized case depth after a carburizing and quenching treatment is determined between 0.2 mm and 1.2 mm inclusive.

The hardness of the core portion of a carburized and quenched parts is between 250 Hv and 450 Hv. Outside this range, it is not possible to consistently obtain impact fracture strength, which is required for high strength joint parts.

It is needless to say that the hardness distribution in the sectional area of a carburized and quenched machine part can be adjusted through minutely adjusting the chemical composition of the material (carburizing steel) and controlling conditions of carburizing treatment, quenching treatment, and/or annealing treatment.

ii) Manufacture Conditions for Parts of Constant Velocity Universal Joints for Drive Shafts (a) Carburizing temperature As described above, parts of constant velocity universal joints for drive shafts require to have a very high dimensional accuracy. Therefore, generation of deformation caused during carburizing and quenching must be minimized. Deformation caused during carburizing and quenching is greatly affected by the temperature at which the carburizing treatment is performed. When the temperature is lowered, the deformation decreases significantly.

In the carburizing steel of the present invention, a deep carburized case layer can be obtained even when it was subjected to a carburizing treatment at a temperature lower than the conventional temperature range of over 930° C., and it is possible to consistently obtain desired characteristics of the steel. However, when the carburizing temperature is below 880° C., a longer time is needed for obtaining an intended carburized case depth, inviting an increase in manufacturing costs. In addition, a carburized case depth required for parts of joints, i.e., not less than 0.2 mm, may not be attained. Therefore, the carburizing temperature must be between 880° and 930° C.

(b) Time for the carburizing treatment

The time for the carburizing treatment is preferably 1 to 3 hours. The carburizing steel of the present invention is capable of forming a carburized layer having a desired carburized case depth by a carburizing treatment for at most 3 hours and at the aforementioned relatively low treatment temperature. If a carburizing treatment is performed for a long time of about 4 hours as in conventional cases, the amount of carbides precipitating in austenite boundaries during the carburizing treatment increases, to thereby reduces breaking strength of parts of constant velocity universal joints for drive shafts. This tendency is particularly significant in frameworks of ball cages.

Since carburizing treatment is performed at a lower temperature for a reduced period of time, manufacturing costs of machine parts are also reduced. However, if carburizing treatment is performed for less than 1 hour, even the carburizing steel of the present invention cannot provide a carburized case depth required for parts of joints, i.e., not less than 0.2 mm.

(c) Hardening temperature

Hardening temperature of the quenching treatment which follows the carburizing treatment is between 800° and 870° C. If the hardening temperature is higher than 870° C., deformation due to thermal treatment increases, the deformation impeding the most critical property for parts of constant velocity universal joints for drive shafts, i.e., dimensional accuracy. On the other hand, if the hardening temperature is less than 800° C., ferrite is generated in the core portion of a machine part to be carburized and quenched, to thereby reduce their strength.

As described above, dimensional accuracy is very important in parts of constant velocity universal joints for drive shafts. Thus, it is particularly an outstanding technical objective to prevent deformation from occurring during a carburizing and quenching treatment. To attain this objective, the temperature of carburizing treatment is determined to fall in the range from 880° to 930° C. and the time for the carburizing treatment is set from 1 to 3 hours.

EXAMPLE 1

Figure 2:
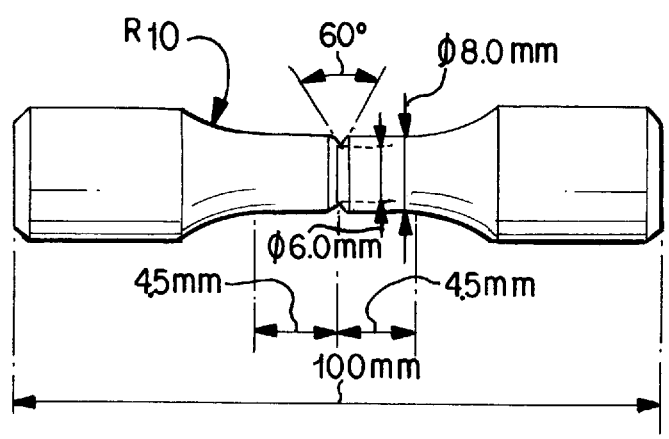
FIG. 2 is a side view of a notched tensile test piece.

Ingots each weighing 150 kg and having the chemical composition shown in Tables 1-1 and 2-1 were prepared by a vacuum melting-casting process. The ingots were hot-forged and normalized. Each ingot was subjected to machine-working to obtain test pieces: smooth round bar-shaped tensile test pieces each having a diameter in the parallel portion of 8 mm, and notched tensile test pieces shown in FIG. 2.

Figure 3:
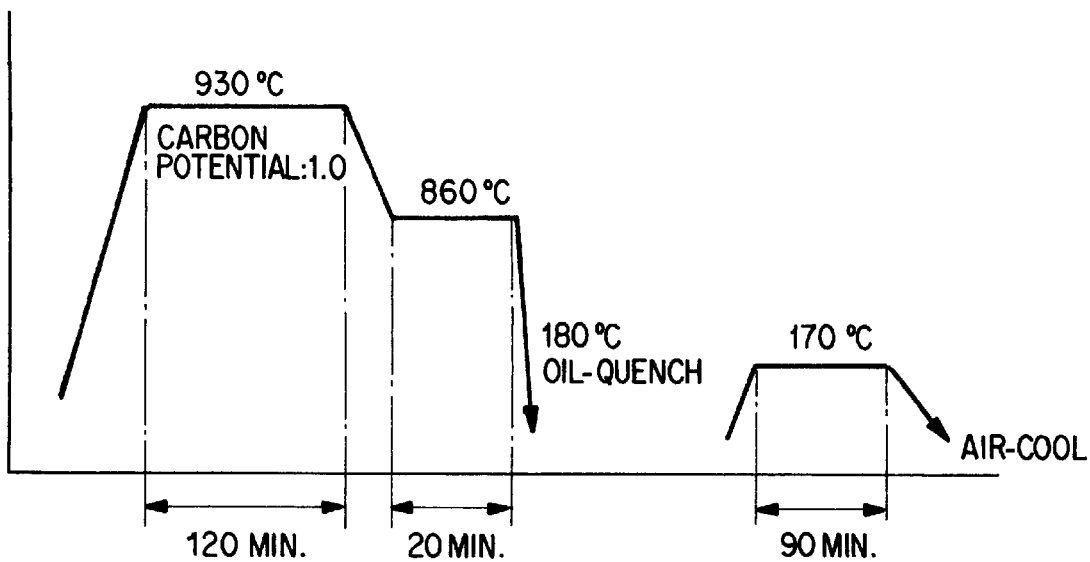
FIG. 3 depicts a heat pattern showing the conditions of carburizing, quenching, and annealing treatments performed in the examples.

The test pieces were subjected to carburizing, quenching, and then annealing under conditions shown in FIG. 3. Subsequently, smooth tensile strength and notch tensile strength were measured so as to evaluate breaking loads. The results are shown in Tables 1-2 and 2-2.

Figure 4:
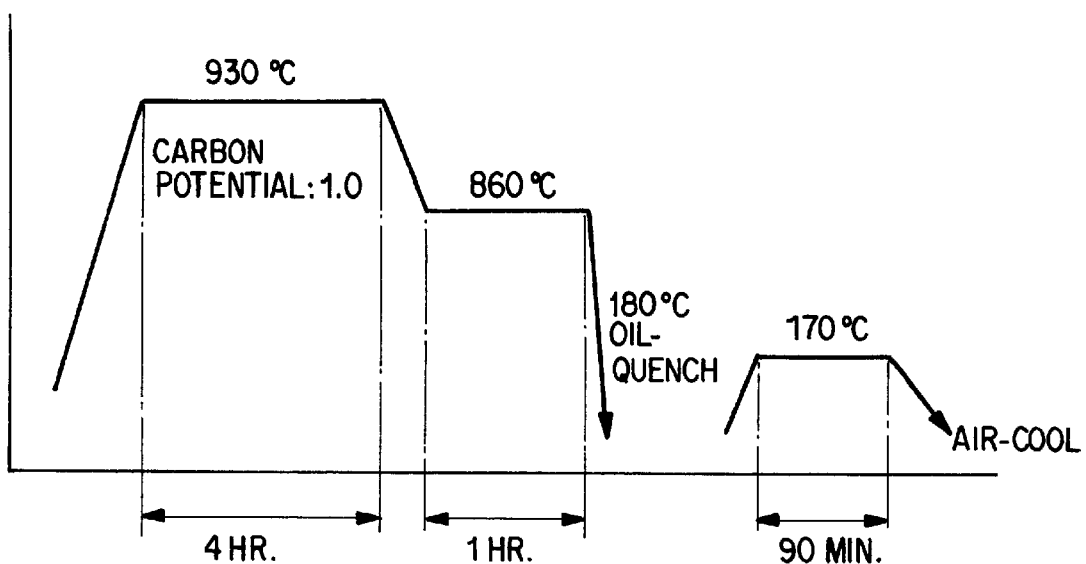
FIG. 4 depicts a heat pattern showing the conditions of conventional carburizing, quenching, and annealing treatments performed in the examples for the purpose of comparison.

For comparison, Tables 1-2 and 2-2 also contain results of treatments performed on the above-described test pieces prepared by machine-working under conventional conditions shown in FIG. 4.

As is apparent from Tables 1-2 and 2-2, all the steels of the present invention, after being subjected to carburizing, quenching, and annealing under relatively mild conditions, exhibited excellent fracture strengths as evidenced by smooth tensile strengths of not less than 120 kgf/mm$^2$ and notch tensile strengths of not less than 130 kgf/mm$^2$.

TABLE 1-1

| Steel No. | Chemical Composition (wt. %, Fe: bal.) | | | | | | | | | | | |
|---|---|---|---|---|---|---|---|---|---|---|---|---|
| | C | Si | Mn | P | S | Cr | Mo | Al | N | B | Ni | others |
| 1 | *0.08 | 0.31 | 0.55 | 0.016 | 0.019 | 0.66 | 0.46 | 0.021 | 0.0055 | 0.0018 | — | — |
| ☆2 | 0.11 | 0.33 | 0.51 | 0.013 | 0.019 | 0.65 | 0.45 | 0.022 | 0.0058 | 0.0020 | — | — |
| ☆3 | 0.16 | 0.32 | 0.57 | 0.011 | 0.017 | 0.59 | 0.44 | 0.020 | 0.0054 | 0.0018 | — | — |
| ☆4 | 0.21 | 0.34 | 0.55 | 0.015 | 0.018 | 0.62 | 0.45 | 0.022 | 0.0051 | 0.0019 | — | — |
| 5 | *0.26 | 0.33 | 0.58 | 0.012 | 0.017 | 0.64 | 0.46 | 0.019 | 0.0057 | 0.0021 | — | — |
| 6 | 0.16 | *0.18 | 0.50 | 0.011 | 0.015 | 0.61 | 0.44 | 0.018 | 0.0059 | 0.0021 | — | — |
| ☆7 | 0.15 | 0.23 | 0.59 | 0.010 | 0.016 | 0.63 | 0.43 | 0.022 | 0.0054 | 0.0022 | — | — |
| ☆8 | 0.16 | 0.29 | 0.58 | 0.011 | 0.015 | 0.61 | 0.43 | 0.020 | 0.0057 | 0.0023 | — | — |
| ☆9 | 0.16 | 0.37 | 0.55 | 0.013 | 0.016 | 0.65 | 0.44 | 0.021 | 0.0049 | 0.0020 | — | — |
| 10 | 0.15 | *0.42 | 0.57 | 0.013 | 0.014 | 0.64 | 0.45 | 0.023 | 0.0047 | 0.0020 | — | — |
| 11 | 0.16 | 0.32 | *0.25 | 0.012 | 0.020 | 0.60 | 0.46 | 0.019 | 0.0055 | 0.0018 | — | — |
| ☆12 | 0.16 | 0.31 | 0.46 | 0.013 | 0.018 | 0.61 | 0.46 | 0.022 | 0.0057 | 0.0019 | — | — |
| ☆13 | 0.16 | 0.33 | 0.64 | 0.012 | 0.018 | 0.60 | 0.43 | 0.023 | 0.0051 | 0.0023 | — | — |

TABLE 1-1-continued

| Steel No. | Chemical Composition (wt. %, Fe: bal.) | | | | | | | | | | | |
|---|---|---|---|---|---|---|---|---|---|---|---|---|
| | C | Si | Mn | P | S | Cr | Mo | Al | N | B | Ni | others |
| ☆14 | 0.15 | 0.30 | 0.85 | 0.011 | 0.017 | 0.61 | 0.45 | 0.020 | 0.0054 | 0.0021 | — | — |
| 15 | 0.15 | 0.30 | *0.93 | 0.013 | 0.019 | 0.61 | 0.47 | 0.018 | 0.0053 | 0.0022 | — | — |
| ☆16 | 0.17 | 0.32 | 0.53 | 0.009 | 0.014 | 0.59 | 0.46 | 0.018 | 0.0051 | 0.0020 | — | — |
| ☆17 | 0.16 | 0.33 | 0.51 | 0.018 | 0.011 | 0.63 | 0.45 | 0.022 | 0.0047 | 0.0018 | — | — |
| 18 | 0.17 | 0.33 | 0.50 | *0.027 | 0.013 | 0.64 | 0.46 | 0.023 | 0.0044 | 0.0022 | — | — |
| ☆19 | 0.16 | 0.36 | 0.57 | 0.010 | 0.002 | 0.63 | 0.43 | 0.023 | 0.0049 | 0.0021 | — | — |
| ☆20 | 0.16 | 0.37 | 0.55 | 0.011 | 0.029 | 0.62 | 0.45 | 0.024 | 0.0051 | 0.0018 | — | — |
| 21 | 0.16 | 0.38 | 0.58 | 0.009 | *0.152 | 0.65 | 0.46 | 0.021 | 0.0060 | 0.0019 | — | — |
| ☆22 | 0.17 | 0.37 | 0.52 | 0.009 | 0.010 | 0.67 | 0.47 | 0.022 | 0.0048 | 0.0016 | 1.31 | — |
| ☆23 | 0.15 | 0.33 | 0.53 | 0.010 | 0.012 | 0.67 | 0.47 | 0.019 | 0.0047 | 0.0014 | 3.77 | — |
| 24 | 0.16 | 0.34 | 0.54 | 0.009 | 0.013 | 0.66 | 0.47 | 0.019 | 0.0044 | 0.0014 | *4.26 | — |

Note
1) ☆; Steel of the Invention. Others; Comparative Examples.
2) *; Out of the Scope of the Invention.

TABLE 1-2

| Steel No. | Treated under Conditions shown in FIG. 3 | | | Treated under Conditions shown in FIG. 4 | |
|---|---|---|---|---|---|
| | Smooth Tensile Strength (kgf/mm$^2$) | Notch Tensile Strength (kgf/mm$^2$) | Rolling Contact Fatigue Limit (kgf/mm$^2$) | Smooth Tensile Strength (kgf/mm$^2$) | Notch Tensile Strength (kgf/mm$^2$) |
| 1 | 98.0 | 103.6 | 292 | 98.0 | 98.5 |
| ☆2 | 130.0 | 122.4 | 319 | 116.7 | 123.5 |
| ☆3 | 128.6 | 114.8 | 321 | 129.5 | 145.7 |
| ☆4 | 130.4 | 145.1 | 324 | 124.6 | 145.1 |
| 5 | 107.9 | 101.5 | 278 | 100.0 | 99.4 |
| 6 | 99.6 | 99.3 | 254 | 98.4 | 98.3 |
| ☆7 | 128.3 | 141.2 | 311 | 127.2 | 132.2 |
| ☆8 | 129.2 | 142.6 | 320 | 128.1 | 138.6 |
| ☆9 | 129.7 | 141.5 | 321 | 126.2 | 137.7 |
| 10 | 100.0 | 100.0 | 252 | 100.3 | 88.9 |
| 11 | 99.8 | 117.3 | 256 | 99.4 | 97.6 |
| ☆12 | 127.9 | 139.2 | 309 | 125.8 | 138.8 |
| ☆13 | 128.3 | 141.6 | 322 | 127.9 | 139.1 |
| ☆14 | 128.0 | 139.2 | 327 | 126.6 | 138.8 |
| 15 | 108.6 | 115.4 | 266 | 117.4 | 115.6 |
| ☆16 | 129.3 | 140.8 | 325 | 128.8 | 132.2 |
| ☆17 | 128.5 | 131.5 | 318 | 127.4 | 128.7 |
| 18 | 99.9 | 98.9 | 287 | 98.7 | 97.8 |
| ☆19 | 129.8 | 133.4 | 322 | 128.7 | 134.6 |
| ☆20 | 129.3 | 132.4 | 318 | 128.3 | 133.5 |
| 21 | 118.4 | 112.7 | 279 | 117.1 | 102.3 |
| ☆22 | 130.2 | 148.3 | 313 | 132.3 | 139.8 |
| ☆23 | 133.6 | 154.9 | 320 | 135.5 | 129.5 |
| 24 | 113.0 | 120.7 | 301 | 130.0 | 130.7 |

TABLE 2-1

| Steel No. | Chemical Composition (wt. %, Fe: bal.) | | | | | | | | | | | |
|---|---|---|---|---|---|---|---|---|---|---|---|---|
| | C | Si | Mn | P | S | Cr | Mo | Al | N | B | Ni | Others |
| 25 | 0.15 | 0.33 | 0.56 | 0.008 | 0.012 | *0.41 | 0.44 | 0.020 | 0.0058 | 0.0026 | — | — |
| ☆26 | 0.16 | 0.33 | 0.57 | 0.009 | 0.010 | 0.57 | 0.43 | 0.026 | 0.0050 | 0.0021 | — | — |
| ☆27 | 0.15 | 0.35 | 0.57 | 0.009 | 0.011 | 0.88 | 0.45 | 0.027 | 0.0054 | 0.0019 | — | — |
| 28 | 0.16 | 0.34 | 0.57 | 0.009 | 0.010 | *0.97 | 0.44 | 0.021 | 0.0064 | 0.0023 | — | — |
| 29 | 0.17 | 0.38 | 0.51 | 0.011 | 0.014 | 0.69 | *0.13 | 0.021 | 0.0055 | 0.0018 | — | — |
| ☆30 | 0.17 | 0.34 | 0.55 | 0.011 | 0.012 | 0.64 | 0.22 | 0.018 | 0.0057 | 0.0026 | — | — |
| ☆31 | 0.16 | 0.36 | 0.51 | 0.010 | 0.011 | 0.66 | 0.44 | 0.022 | 0.0051 | 0.0027 | — | — |
| ☆32 | 0.16 | 0.33 | 0.52 | 0.010 | 0.014 | 0.67 | 0.79 | 0.024 | 0.0048 | 0.0020 | — | — |
| 33 | 0.16 | 0.37 | 0.50 | 0.013 | 0.013 | 0.66 | *1.06 | 0.026 | 0.0044 | 0.0023 | — | — |
| ☆34 | 0.16 | 0.31 | 0.59 | 0.012 | 0.014 | 0.60 | 0.47 | 0.023 | 0.0043 | 0.0017 | — | — |
| ☆35 | 0.16 | 0.35 | 0.52 | 0.011 | 0.012 | 0.61 | 0.48 | 0.027 | 0.0059 | 0.0017 | — | — |
| 36 | 0.17 | 0.33 | 0.54 | 0.011 | 0.013 | 0.59 | 0.46 | 0.021 | *0.0082 | 0.0016 | — | — |
| 37 | 0.17 | 0.36 | 0.59 | 0.010 | 0.010 | 0.64 | 0.46 | 0.019 | 0.0047 | *0.0003 | — | — |
| ☆38 | 0.16 | 0.37 | 0.55 | 0.008 | 0.011 | 0.62 | 0.45 | 0.019 | 0.0044 | 0.0017 | — | — |
| ☆39 | 0.17 | 0.33 | 0.56 | 0.008 | 0.009 | 0.65 | 0.46 | 0.027 | 0.0048 | 0.0075 | — | — |
| 40 | 0.18 | 0.36 | 0.57 | 0.009 | 0.009 | 0.65 | 0.48 | 0.023 | 0.0043 | *0.0094 | — | — |
| ☆41 | 0.16 | 0.33 | 0.55 | 0.010 | 0.012 | 0.62 | 0.47 | 0.030 | 0.0044 | 0.0021 | — | Ti: 0.03 |
| ☆42 | 0.16 | 0.34 | 0.56 | 0.010 | 0.010 | 0.60 | 0.46 | 0.031 | 0.0051 | 0.0022 | — | Nb: 0.03 |
| ☆43 | 0.15 | 0.33 | 0.56 | 0.009 | 0.011 | 0.64 | 0.47 | 0.029 | 0.0050 | 0.0019 | — | V: 0.08 |
| ☆44 | 0.16 | 0.35 | 0.57 | 0.009 | 0.010 | 0.66 | 0.47 | 0.033 | 0.0047 | 0.0022 | — | Zr: 0.10 |
| ☆45 | 0.15 | 0.34 | 0.57 | 0.009 | 0.012 | 0.61 | 0.47 | 0.031 | 0.0042 | 0.0020 | — | Ti: 0.02, Nb: 0.03 |

TABLE 2-1-continued

| Steel No. | Chemical Composition (wt. %, Fe: bal.) | | | | | | | | | | | |
|---|---|---|---|---|---|---|---|---|---|---|---|---|
| | C | Si | Mn | P | S | Cr | Mo | Al | N | B | Ni | Others |
| ☆46 | 0.16 | 0.34 | 0.54 | 0.010 | 0.013 | 0.62 | 0.48 | 0.032 | 0.0040 | 0.0023 | 1.80 | Ti: 0.02, Nb: 0.03 |
| Δ47 | 0.14 | 0.25 | 0.72 | 0.021 | 0.014 | *1.05 | *— | 0.035 | *0.0140 | *— | — | — |
| Δ48 | 0.15 | *0.09 | *0.28 | 0.009 | 0.010 | *0.40 | 0.31 | 0.031 | 0.0047 | 0.0016 | — | Ti: 0.031 |

Note
1) ☆; Steel of the Invention. Δ; Conventional Steels. Others; Comparative Examples.
2) *; Out of the Scope of the Invention.

TABLE 2-2

| | Treated under Conditions shown in FIG. 3 | | | Treated under Conditions shown in FIG. 4 | |
|---|---|---|---|---|---|
| Steel No. | Smooth Tensile Strength (kgf/mm$^2$) | Notch Tensile Strength (kgf/mm$^2$) | Rolling Contact Fatigue Limit (kgf/mm$^2$) | Smooth Tensile Strength (kgf/mm$^2$) | Notch Tensile Strength (kgf/mm$^2$) |
| 25 | 110.7 | 128.5 | 291 | 129.9 | 128.5 |
| ☆26 | 130.0 | 146.4 | 321 | 131.0 | 147.7 |
| ☆27 | 129.3 | 140.8 | 316 | 133.3 | 138.9 |
| 28 | 117.1 | 99.3 | 289 | 117.1 | 96.7 |
| 29 | 106.4 | 110.6 | 299 | 105.5 | 119.9 |
| ☆30 | 128.5 | 131.7 | 313 | 129.4 | 121.8 |
| ☆31 | 129.2 | 133.4 | 320 | 133.3 | 135.4 |
| ☆32 | 130.7 | 134.3 | 323 | 131.4 | 134.6 |
| 33 | 119.0 | 111.3 | 301 | 127.2 | 128.4 |
| ☆34 | 128.7 | 133.0 | 313 | 128.9 | 138.5 |
| ☆35 | 128.0 | 132.4 | 313 | 128.1 | 129.9 |
| 36 | 96.5 | 101.3 | 279 | 101.3 | 99.3 |
| 37 | 97.6 | 98.7 | 287 | 96.4 | 97.7 |
| ☆38 | 129.8 | 145.8 | 323 | 128.9 | 146.2 |
| ☆39 | 128.0 | 147.6 | 320 | 128.2 | 146.9 |
| 40 | 98.3 | 93.5 | 279 | 99.3 | 84.6 |
| ☆41 | 127.0 | 144.2 | 311 | 127.6 | 143.9 |
| ☆42 | 129.8 | 143.6 | 318 | 126.7 | 142.5 |
| ☆43 | 120.6 | 133.5 | 315 | 121.5 | 134.4 |
| ☆44 | 127.7 | 142.9 | 315 | 126.9 | 143.8 |
| ☆45 | 128.3 | 142.7 | 311 | 128.0 | 142.2 |
| ☆46 | 128.0 | 147.9 | 315 | 129.2 | 146.9 |
| Δ47 | 119.1 | 86.9 | 287 | 116.8 | 84.1 |
| Δ48 | 98.2 | 91.2 | 256 | 97.5 | 88.3 |

EXAMPLE 2

Using each steel having the chemical composition shown in Tables 1-1 and 2-2, disk-shaped test pieces having a diameter of 60.0 mm and a thickness of 5.0 mm were prepared. The test pieces were subjected to treatments under conditions shown in FIG. 3, and then to mirror-like finishing so that the average surface roughness (Ra) was 0.05 μm. A thrust-type rolling contact fatigue test was performed on the obtained mirror-like polished test pieces using #60 spindle oil for lubrication at room temperature.

Rolling contact fatigue was evaluated as follows: different surface pressures were applied to test pieces and the repetition of application of stress before the peeling catastrophe was counted. Using an S-N curve, surface pressure of the rolling contact fatigue limit was obtained. The thus-computed surface pressures were compared to one another.

The results are also shown in Tables 1-2 and 2-2. As is apparent from the test results, all the carburizing steels of the present invention exhibited improved rolling contact fatigue limits not lower than 300 kg/mm$^2$, proving that they are clearly superior to conventional steels (250–290 kgf/mm$^2$).

EXAMPLE 3

Figure 5:
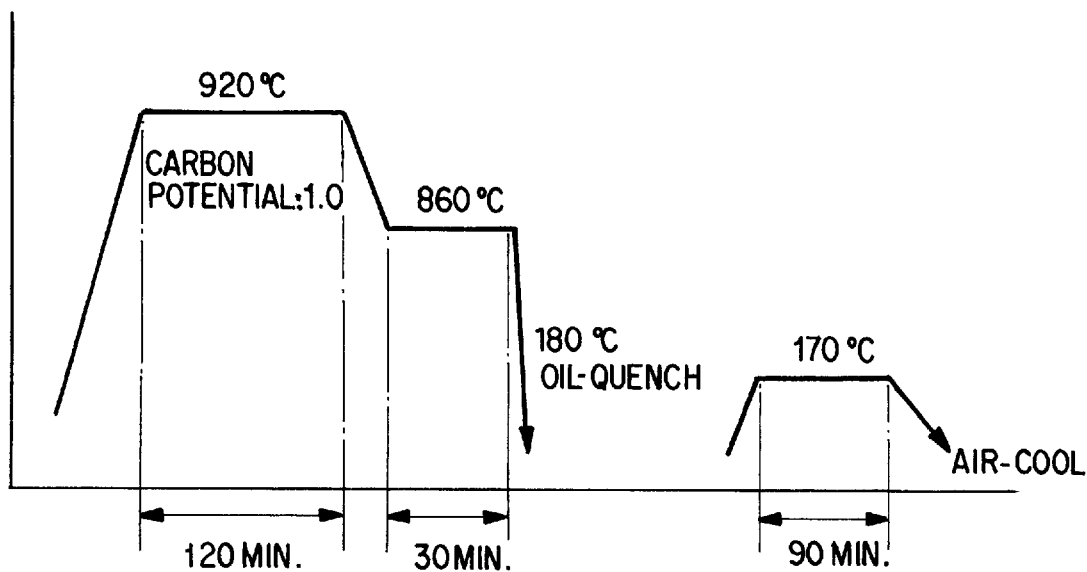
FIG. 5 depicts a heat pattern showing different conditions of carburizing, quenching, and annealing treatments performed in the examples.

The test pieces prepared in Example 1 were treated under conditions shown in FIG. 5, and then subjected to a tensile test. The smooth tensile strength and notch tensile strength were measured, and the ductility and toughness of steel after carburizing and quenching treatment were evaluated.

Using the same tensile test pieces, hardness was measured for each piece at various points in a sectional area in the parallel portion of the test piece. Surface hardness, carburized case depth, and hardness of the core portion were obtained. The carburized case depth was measured from the surface at which the hardness of the carburized layer in the surface was Hv 513. The results are shown in Table 3-1 and 3-2. The results show that all the steels that satisfy the conditions of the present invention, which were subjected carburizing, quenching, and annealing at a low temperature for shortened periods, exhibited excellent fracture strengths as evidenced by smooth tensile strengths of not less than 120 kgf/mm$^2$ and notch tensile strengths of not less than 130 kgf/mm$^2$.

TABLE 3-1

| Steel No. | Surface Hardness (Hv) | Carburized Case Depth (mm) | Hardness of the Core (Hv) | Smooth Tensile Strength (kgf/mm$^2$) | Notch Tensile Strength (kgf/mm$^2$) |
|---|---|---|---|---|---|
| 1 | 903 | 0.39 | 248 | 98.0 | 103.6 |
| ☆2 | 911 | 0.50 | 305 | 107.9 | 122.4 |
| ☆3 | 920 | 0.52 | 326 | 128.6 | 144.8 |
| ☆4 | 901 | 0.51 | 334 | 130.4 | 145.1 |
| 5 | 907 | 0.53 | 357 | 130.0 | 121.5 |
| 6 | 910 | 0.47 | 286 | 99.6 | 99.3 |
| ☆7 | 900 | 0.50 | 317 | 128.3 | 141.2 |
| ☆8 | 906 | 0.51 | 315 | 129.2 | 142.6 |
| ☆9 | 909 | 0.50 | 311 | 129.7 | 141.5 |
| 10 | 891 | 0.51 | 285 | 100.0 | 100.0 |
| 11 | 902 | 0.48 | 273 | 99.8 | 117.3 |
| ☆12 | 899 | 0.50 | 310 | 127.9 | 139.2 |
| ☆13 | 897 | 0.51 | 317 | 128.3 | 141.6 |
| ☆14 | 904 | 0.50 | 326 | 128.0 | 139.2 |
| 15 | 921 | 0.52 | 320 | 128.6 | 125.4 |
| ☆16 | 900 | 0.51 | 322 | 129.3 | 140.8 |
| ☆17 | 899 | 0.50 | 320 | 128.5 | 131.5 |
| 18 | 899 | 0.52 | 321 | 99.9 | 98.9 |
| ☆19 | 898 | 0.52 | 319 | 129.8 | 133.4 |
| ☆20 | 902 | 0.50 | 317 | 129.3 | 132.4 |
| 21 | 905 | 0.50 | 310 | 128.4 | 122.7 |
| ☆22 | 886 | 0.47 | 347 | 130.2 | 148.3 |
| ☆23 | 895 | 0.49 | 360 | 133.6 | 154.9 |
| 24 | 893 | 0.44 | 369 | 133.0 | 150.7 |

TABLE 3-2

| Steel No. | Surface Hardness (Hv) | Carburized Case Depth (mm) | Hardness of the Core (Hv) | Smooth Tensile Strength (kgf/mm$^2$) | Notch Tensile Strength (kgf/mm$^2$) |
|---|---|---|---|---|---|
| 25 | 914 | 0.52 | 291 | 120.7 | 118.5 |
| ☆26 | 910 | 0.57 | 317 | 130.0 | 146.4 |

TABLE 3-2-continued

| Steel No. | Surface Hardness (Hv) | Carburized Case Depth (mm) | Hardness of the Core (Hv) | Smooth Tensile Strength (kgf/mm$^2$) | Notch Tensile Strength (kgf/mm$^2$) |
|---|---|---|---|---|---|
| ☆27 | 926 | 0.55 | 322 | 129.3 | 140.8 |
| 28 | 915 | 0.56 | 300 | 117.1 | 99.3 |
| 29 | 920 | 0.51 | 297 | 106.4 | 110.6 |
| ☆30 | 918 | 0.53 | 319 | 128.5 | 131.7 |
| ☆31 | 924 | 0.52 | 322 | 129.2 | 133.4 |
| ☆32 | 926 | 0.55 | 325 | 130.7 | 134.3 |
| 33 | 900 | 0.56 | 322 | 129.0 | 131.3 |
| ☆34 | 903 | 0.54 | 327 | 128.7 | 133.0 |
| ☆35 | 907 | 0.52 | 326 | 128.0 | 132.4 |
| 36 | 915 | 0.42 | 288 | 106.5 | 111.3 |
| 37 | 916 | 0.52 | 283 | 97.6 | 98.7 |
| ☆38 | 920 | 0.59 | 315 | 129.8 | 145.8 |
| ☆39 | 901 | 0.57 | 317 | 128.0 | 147.6 |
| 40 | 899 | 0.50 | 315 | 98.3 | 93.5 |
| ☆41 | 912 | 0.54 | 313 | 127.0 | 144.2 |
| ☆42 | 896 | 0.56 | 315 | 129.8 | 143.6 |
| ☆43 | 900 | 0.56 | 310 | 120.6 | 133.5 |
| ☆44 | 899 | 0.51 | 311 | 127.7 | 142.9 |
| ☆45 | 907 | 0.53 | 314 | 128.3 | 142.7 |
| ☆46 | 922 | 0.59 | 356 | 128.0 | 147.9 |
| Δ47 | 926 | 0.37 | 265 | 119.1 | 86.9 |
| Δ48 | 883 | 0.41 | 269 | 98.2 | 91.2 |

EXAMPLE 4

Ingots each weighing 1,000 kg and having the chemical composition shown in Table 4 were prepared by a vacuum melting-casting process. The ingots were hot-forged into round slabs. Steel pipes were produced of the slabs in mandrel mill pipe-making process followed by cold-drawing and stress relief annealing. As a result, steel pipe having outer diameter of 60 mm and inner diameter of 50 mm was obtained.

Figure 6:
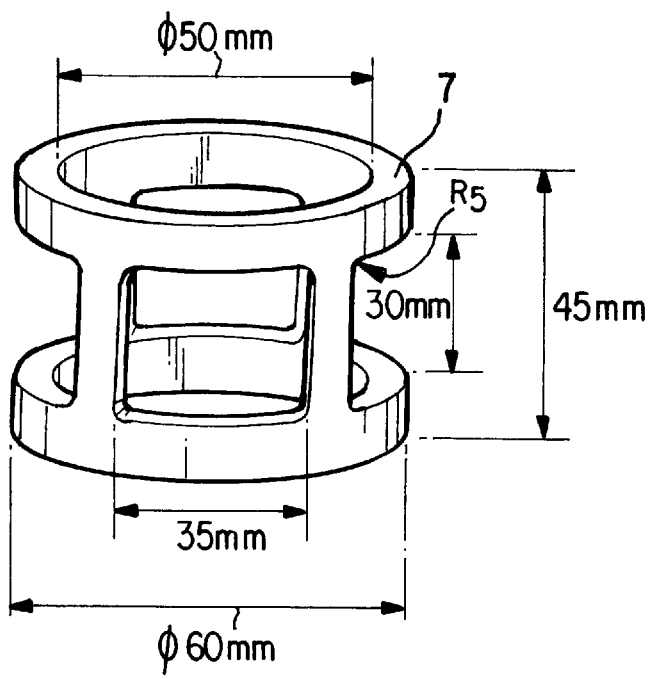
FIG. 6 is a perspective view of a test model of a ball cage used in fracture tests.
Figure 7:
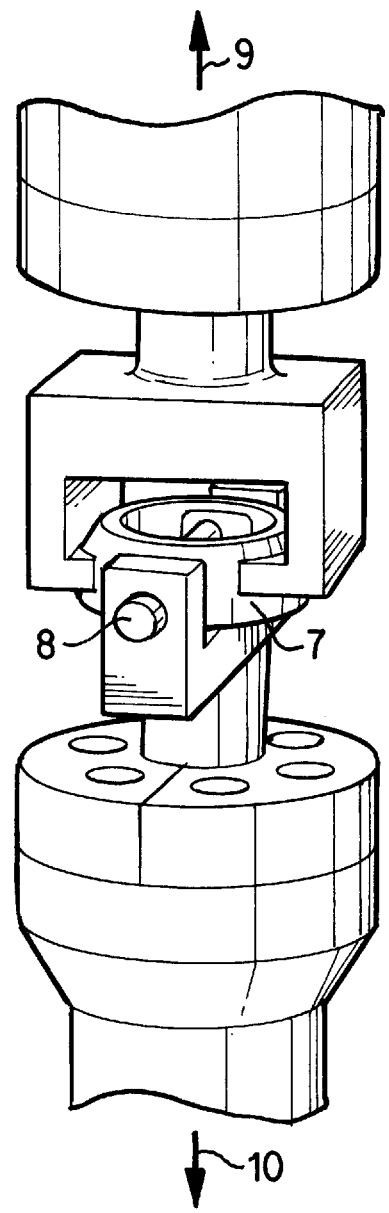
FIG. 7 is a diagram showing the fracture test (impact tensile test) performed on ball cages of examples.

The thus-formed pipe was cut to 50 mm and machine-worked, thereby obtaining models of ball cages of constant velocity universal joints for drive shafts. The model are shown in FIG. 6. The models were subjected to gas carburizing, quenching, and annealing under the below-described conditions:

carburizing treatment: carbon potential=0.9 to 1.0, heated at 930° C. for 4 hours quenching treatment: cooled to 840° C. in the furnace, followed by oil quenching annealing treatment: held at 180° C. for 1 hour, followed by polishing Each ball cage test model which had undergone the above treatments was subjected to impact tensile test using an electrically-operated hydraulic tensile tester shown in FIG. 7 (capacity: 10 tons). In the test, a round bar 8 is inserted into each ball cage test model 7 shown in FIG. 7, so as to secure the crosshead 9 at the upper position. The lower actuator 10 was located and pulled down at a speed of 120 mm/sec for applying a tensile force to the test model. The fracture load was measured.

The same test procedure was repeated for 3 ball cage test models, and the three data of fracture strength were averaged. The results are also shown in Table 4.

Separately, in order to evaluate workability of steel pipe pieces, the aforementioned steel pipe was cut to short pipes of 50 cm in length. Each short pipe piece was spread to prepare a 50 mm×188 mm flat sheet. The sheet was prepared in triplicate and used in a punching test. Both surfaces of each sheet for punching were polished with a grindstone. Subsequently, the sheet was punched using a hydraulic press, thereby assessing its workability. The conditions of punching were as follows:

punch material: High speed steel punch diameter: 15.7 mm punching speed: 2.5 mm/s The results of assessment regarding workability in this punching test are also shown in Table 4. The judgment as to "good" was based on smoothness of the surface created by punching.

As shown in Table 4, it is clearly seen that the carburizing steel of the present invention exhibit excellent workability, and that, when the carburizing steels of the present invention are made into ball cages of a constant velocity universal joint for a drive shaft, the ball cages which have been undergone carburizing and quenching treatment exhibit enhanced impact tensile strength.

TABLE 4

| Steel No. | Chemical Composition (wt. %, Fe: bal.) | | | | | | | | | | | Breaking load (kgf) | Workability |
|---|---|---|---|---|---|---|---|---|---|---|---|---|---|
| | C | Si | Mn | P | S | Cr | Mo | Al | N | B | Ni | others | | |
| ☆49 | 0.15 | 0.33 | 0.57 | 0.010 | 0.010 | 0.59 | 0.45 | 0.021 | 0.0048 | 0.0019 | — | — | 1590 | good |
| ☆50 | 0.16 | 0.35 | 0.53 | 0.009 | 0.011 | 0.60 | 0.47 | 0.020 | 0.0053 | 0.0018 | 1.36 | — | 1660 | good |
| ☆51 | 0.16 | 0.34 | 0.55 | 0.009 | 0.009 | 0.61 | 0.46 | 0.024 | 0.0044 | 0.0020 | — | Ti: 0.03 | 1610 | good |
| ☆52 | 0.15 | 0.34 | 0.56 | 0.009 | 0.009 | 0.63 | 0.46 | 0.027 | 0.0052 | 0.0021 | — | Ti: 0.03 Nb: 0.03 | 1620 | good |
| ☆53 | 0.16 | 0.33 | 0.56 | 0.010 | 0.011 | 0.61 | 0.47 | 0.022 | 0.0042 | 0.0022 | 1.87 | Ti: 0.02 Nb: 0.03 | 1670 | good |
| Δ54 | 0.15 | 0.26 | 0.70 | 0.011 | 0.011 | *1.01 | *— | 0.025 | *0.0133 | *— | — | — | 1215 | good |
| Δ55 | 0.16 | *0.09 | *0.26 | 0.009 | 0.011 | *0.43 | 0.32 | 0.023 | 0.0049 | 0.0018 | — | Ti: 0.03 | 1140 | good |

Note
1) ☆; Steel of the Invention. Δ; Conventional Steels.
2) *; Out of the Scope of the Invention.

TABLE 5

Treating Conditions after Pipe-making

| Mark | Primary Annealing Treatment | Cross-sectional Reduction of Cold-Drawing (%) | Secondary Annealing Treatment |
|---|---|---|---|
| A | heated at 870° C. → furnace-cooled to 650° C. | 20 | heated at 870° C. → furnace-cooled to 650° C. |
| B | heated at 870° C. → furnace-cooled to 650° C. | 40 | heated at 870° C. → furnace-cooled to 650° C. |

TABLE 5-continued

Treating Conditions after Pipe-making

| Mark | Primary Annealing Treatment | Cross-sectional Reduction of Cold-Drawing (%) | Secondary Annealing Treatment |
|------|-----------------------------|-----------------------------------------------|-------------------------------|
| C | heated at 870° C. → furnace-cooled to 650° C. | 50 | heated at 870° C. → furnace-cooled to 650° C. |
| *D | heated at 870° C. → furnace-cooled to 650° C. | *60 | heated at 870° C. → furnace-cooled to 650° C. |
| *E | heated at 870° C. → furnace-cooled to 650° C. | *80 | heated at 870° C. → furnace-cooled to 650° C. |
| F | heated at 870° C. → furnace-cooled to 650° C. | 20 | heated at 700° C. → air-cooled to room temp. |
| G | heated at 870° C. → furnace-cooled to 650° C. | 40 | heated at 700° C. → air-cooled to room temp. |
| H | heated at 870° C. → furnace-cooled to 650° C. | 50 | heated at 700° C. → air-cooled to room temp. |
| *I | heated at 870° C. → furnace-cooled to 650° C. | *60 | heated at 700° C. → air-cooled to room temp. |
| *J | heated at 870° C. → furnace-cooled to 650° C. | *80 | heated at 700° C. → air-cooled to room temp. |

Note: *Out of Scope of the Invention.

EXAMPLE 5

Steel pipes manufactured in Example 4 and having the composition shown in Table 4 were subjected to a primary annealing treatment, cold-drawing, and a secondary annealing treatment under the conditions shown in Table 5. Pipe pieces of 50 mm in length were cut out from each of the thus-treated pipes. Each short pipe piece was spread to prepare a 50 mm×188 mm flat sheet.

In a manner similar to that described in Example 4, the both surfaces of each punching test piece were polished with a grindstone. Subsequently, the sheet was punched using a hydraulic press, thereby assessing its workability. The conditions of punching were the same as those described in Example 4.

The results of assessment regarding workability in this punching test are shown in Tables 6, 7 and 8. From the results shown in these Tables, it is confirmed that the steel pipe manufactured by the method of the present invention exhibits excellent workability.

TABLE 6

| | | Workability | | |
|---|---|---|---|---|
| Test No. | Tested Steel (No. in TABLE 4) | Treating Condition (Mark in TABLE 5) | Roughness of Punched Hole Surface | Dimensional Accuracy | Remarks of Poor Workability |
| (1) | 49 | A | good | good | — |
| (2) | 49 | B | good | good | — |
| (3) | 49 | C | good | good | — |
| (4) | 49 | *D | poor | poor | dull surface |
| (5) | 49 | *E | poor | poor | dull surface |
| (6) | 49 | F | good | good | — |
| (7) | 49 | G | good | good | — |
| (8) | 49 | H | good | good | — |
| (9) | 49 | *I | poor | poor | inclined and rough surface |

TABLE 6-continued

| Test No. | Tested Steel (No. in TABLE 4) | Treating Condition (Mark in TABLE 5) | Roughness of Punched Hole Surface | Dimensional Accuracy | Remarks of Poor Workability |
|---|---|---|---|---|---|
| (10) | 49 | *J | poor | poor | inclined and rough surface |
| (11) | 50 | A | good | good | — |
| (12) | 50 | B | good | good | — |
| (13) | 50 | C | good | good | — |
| (14) | 50 | *D | poor | poor | dull surface |
| (15) | 50 | *E | poor | poor | dull surface |
| (16) | 50 | F | good | good | — |
| (17) | 50 | G | good | good | — |
| (18) | 50 | H | good | good | — |
| (19) | 50 | *I | poor | poor | inclined and rough surface |
| (20) | 50 | *J | poor | poor | inclined and rough surface |

TABLE 7

| Test No. | Tested Steel (No. in TABLE 4) | Treating Condition (Mark in TABLE 5) | Roughness of Punched Hole Surface | Dimensional Accuracy | Remarks of Poor Workability |
|---|---|---|---|---|---|
| (21) | 51 | A | good | good | — |
| (22) | 51 | B | good | good | — |
| (23) | 51 | C | good | good | — |
| (24) | 51 | *D | poor | poor | dull surface |
| (25) | 51 | *E | poor | poor | dull surface |
| (26) | 51 | F | good | good | — |
| (27) | 51 | G | good | good | — |
| (28) | 51 | H | good | good | — |
| (29) | 51 | *I | poor | poor | inclined and rough surface |
| (30) | 51 | *J | poor | poor | inclined and rough surface |
| (31) | 52 | A | good | good | — |
| (32) | 52 | B | good | good | — |
| (33) | 52 | C | good | good | — |
| (34) | 52 | *D | poor | poor | dull surface |
| (35) | 52 | *E | poor | poor | dull surface |
| (36) | 52 | F | good | good | — |
| (37) | 52 | G | good | good | — |
| (38) | 52 | H | good | good | — |
| (39) | 52 | *I | poor | poor | inclined and rough surface |
| (40) | 52 | *J | poor | poor | inclined and rough surface |

TABLE 8

| Test No. | Tested Steel (No. in TABLE 4) | Treating Condition (Mark in TABLE 5) | Roughness of Punched Hole Surface | Dimensional Accuracy | Remarks of Poor Workability |
|---|---|---|---|---|---|
| (41) | 53 | A | good | good | — |
| (42) | 53 | B | good | good | — |
| (43) | 53 | C | good | good | — |
| (44) | 53 | *D | poor | poor | dull surface |
| (45) | 53 | *E | poor | poor | dull surface |
| (46) | 53 | F | good | good | — |
| (47) | 53 | G | good | good | — |
| (48) | 53 | H | good | good | — |

TABLE 8-continued

| Test No. | Tested Steel (No. in TABLE 4) | Treating Condition (Mark in TABLE 5) | Workability | | |
|---|---|---|---|---|---|
| | | | Roughness of Punched Hole Surface | Dimensional Accuracy | Remarks of Poor Workability |
| (49) | 53 | *I | poor | poor | inclined and rough surface |
| (50) | 53 | *J | poor | poor | inclined and rough surface |

EXAMPLE 6

Steel pipes manufactured in the process described in Example 4 of steel No. 49 of the present invention and conventional steel No. 55 (both shown in Table 4) were subjected to a primary annealing treatment, cold-drawing, and a secondary annealing treatment under the conditions shown in Tables 9 and 10. Pipe pieces of 50 mm in length were cut out from each of the thus-treated pipes. Each short pipe piece was spread to prepare a 50 mm×188 mm flat sheet, which was served as a punching test piece. In a manner similar to those described in Examples 4 and 5, the both surfaces of each punching test piece were polished with a grindstone. Subsequently, the sheet was punched using a hydraulic press, thereby assessing its workability.

Separately, from the flat sheet prepared by spreading the above-described pipe piece, square pillar-shaped tensile test pieces, each having a sectional area of 6.0 mm×5.0 mm at the parallel portion, were prepared. They were models for simulating the pillars of the framework of a ball cage. The model pieces were subjected to carburizing, quenching, and annealing under conditions shown in FIG. 4. The model pieces after undergoing thermal treatments were visually observed for the metallographic structure regarding the presence or absence of a "structure including coarse grains". Tensile strength was also measured. The results are shown in Tables 9 and 10.

From Tables 9 and 10, it is clearly seen that steel pipes manufactured by the method of the present invention exhibit not only excellent workability, but also excellent mechanical properties after being carburized and quenched.

TABLE 9

| | | Treating Conditions after Pipe-making | | | Workability | | Properties after Carburizing-quenching | |
|---|---|---|---|---|---|---|---|---|
| Test No. | Tested Steel (No. in TABLE 3) | Primary Annealing Temperature (°C.) | Cross-sectional Reduction of Cold-drawing (%) | Secondary Annealing Temperature (°C.) | Roughness of Punched Hole Surface | Dimensional Accuracy | Micro-structure | Tensile Strength (kgf/mm²) |
| (71) | ☆49 | 870 | 20 | *600 | ○ | ○ | Δ | 112.4 |
| (72) | ☆49 | 870 | 40 | *600 | ○ | ○ | Δ | 113.0 |
| (73) | ☆49 | 870 | 50 | *600 | ○ | ○ | Δ | 112.2 |
| (74) | ☆49 | 870 | *60 | *600 | Δ | Δ | Δ | 110.9 |
| (75) | ☆49 | 870 | 20 | 650 | ◎ | ◎ | ○ | 123.5 |
| (76) | ☆49 | 870 | 40 | 650 | ◎ | ◎ | ○ | 125.6 |
| (77) | ☆49 | 870 | 50 | 650 | ◎ | ◎ | ○ | 125.0 |
| (78) | ☆49 | 870 | *60 | 650 | Δ | Δ | Δ | 110.0 |
| (79) | ☆49 | 870 | 20 | 800 | ◎ | ◎ | ○ | 128.2 |
| (80) | ☆49 | 870 | 40 | 800 | ◎ | ◎ | ○ | 126.1 |
| (81) | ☆49 | 870 | 50 | 800 | ◎ | ◎ | ○ | 128.3 |
| (82) | ☆49 | 870 | *60 | 800 | Δ | Δ | Δ | 110.2 |
| (83) | ☆49 | 870 | 20 | 950 | ◎ | ◎ | ○ | 125.4 |
| (84) | ☆49 | 870 | 40 | 950 | ◎ | ◎ | ○ | 125.3 |
| (85) | ☆49 | 870 | 50 | 950 | ◎ | ◎ | ○ | 125.7 |
| (86) | ☆49 | 870 | *60 | 950 | Δ | Δ | Δ | 110.1 |
| (87) | ☆49 | 870 | 20 | *980 | ○ | ○ | ○ | 125.5 |
| (88) | ☆49 | 870 | 40 | *980 | ○ | ○ | ○ | 125.6 |
| (89) | ☆49 | 870 | 50 | *980 | ○ | ○ | ○ | 125.4 |
| (90) | ☆49 | 870 | *60 | *980 | Δ | Δ | Δ | 110.0 |

Note
1) *; Out of Scope of the Invention.
2) Workability ◎; excellent, ○; good, Δ; slightly poor, x; poor.
3) Micro-structure ○; no coarse grains, Δ; some coarse grains, x; many coarse grains.
4) Tensile strength was measured by using square pillar-shaped test pieces.

TABLE 10

| Test No. | Tested Steel (No. in TABLE 3) | Primary Annealing Temperature (°C.) | Cross-sectional Reduction of Cold-drawing (%) | Secondary Annealing Temperature (°C.) | Workability Roughness of Punched Hole Surface | Workability Dimensional Accuracy | Carburizing-quenching Micro-structure | Carburizing-quenching Tensile Strength (kgf/mm²) |
|---|---|---|---|---|---|---|---|---|
| (51) | Δ55 | 870 | 20 | *600 | x | x | x | 96.6 |
| (52) | Δ55 | 870 | 40 | *600 | x | x | x | 96.9 |
| (53) | Δ55 | 870 | 50 | *600 | x | x | x | 97.2 |
| (54) | Δ55 | 870 | *60 | *600 | x | x | x | 94.5 |
| (55) | Δ55 | 870 | 20 | 650 | x | x | x | 98.7 |
| (56) | Δ55 | 870 | 40 | 650 | x | x | x | 99.2 |
| (57) | Δ55 | 870 | 50 | 650 | x | x | x | 99.0 |
| (58) | Δ55 | 870 | *60 | 650 | x | x | x | 95.0 |
| (59) | Δ55 | 870 | 20 | 800 | x | x | x | 98.8 |
| (60) | Δ55 | 870 | 40 | 800 | x | x | x | 97.5 |
| (61) | Δ55 | 870 | 50 | 800 | x | x | x | 97.0 |
| (62) | Δ55 | 870 | *60 | 800 | x | x | x | 94.7 |
| (63) | Δ55 | 870 | 20 | 950 | x | x | x | 98.3 |
| (64) | Δ55 | 870 | 40 | 950 | x | x | x | 97.9 |
| (65) | Δ55 | 870 | 50 | 950 | x | x | x | 98.4 |
| (66) | Δ55 | 870 | *60 | 950 | x | x | x | 94.5 |
| (67) | Δ55 | 870 | 20 | *980 | x | x | x | 94.0 |
| (68) | Δ55 | 870 | 40 | *980 | x | x | x | 94.2 |
| (69) | Δ55 | 870 | 50 | *980 | x | x | x | 93.9 |
| (70) | Δ55 | 870 | *60 | *980 | x | x | x | 94.3 |

Note
1) *; Out of Scope of the Invention.
2) Workability x; poor.
3) Micro-structure x; many coarse grains.
4) Tensile strength was measured by using square pillar-shaped test pieces.

EXAMPLE 7

Steel Nos. 49, 50, 51, 53, 54, and 55 shown in Table 4 were prepared by a vacuum melting-casting process, thereby obtaining ingots each weighing 150 kg. The ingots were hot-forged and normalized. Each ingot was subjected to machine-working to obtain square pillar test pieces shown in FIG. 8.

The test pieces were subjected to carburizing, quenching, and tempering under various conditions shown in FIG. 9 and Tables 11-1 and 12-1. Hardness was measured for each piece at various points in a sectional area in the parallel portion of each test piece. Surface hardness, carburized case depth, and hardness of the core portion were obtained. The carburized case depth was measured in the same manner as described in Example 3. Using tensile test pieces which had undergone identical carburizing, quenching, and annealing treatments, a tensile test was performed. Fracture loads were also determined.

Figure 10:
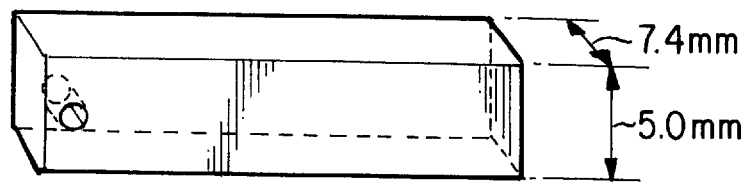
FIG. 10 depicts a test piece used in examples for measuring deformation caused by a heat treatment.
Figure 11:
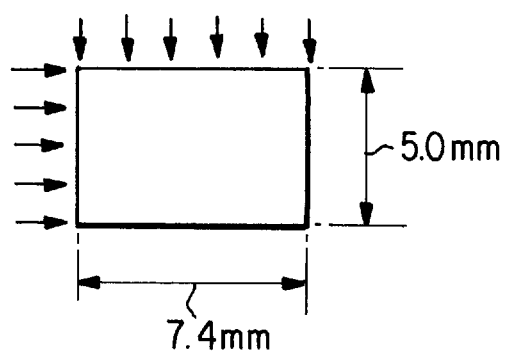
FIG. 11 depicts a measuring method used in the test for deformation caused by a heat treatment.

Moreover, deformation generated in the pillar portion of a ball cage after undergoing a carburizing and quenching treatment was simulated using test pieces having the shape and dimensions shown in FIG. 10. In this test, a highly precise dial gauge was used, and the thickness at each of the five positions in the short side and six positions in the long side of the pillar shown in FIG. 11 was measured before and after the carburizing and quenching treatments. The difference was taken as an amount of deformation. Among the values at five or six positions, the difference obtained by subtracting the minimum value of the amount of deformation from the maximum value was taken as a maximum deformation amount. The results are shown in Tables 11-2 and 12-2.

From the results shown in Tables 11-1, 11-2, 12-1 and 12-2, it is confirmed that the parts which were carburized and quenched under the conditions defined in the present invention exhibit enhanced fracture strength. It is also seen that those treated under the conditions provided by the present invention generate less thermal deformation as a whole.

From the carburizing conditions in Tables 11 and 12, it is found that even when the carburizing treatment was performed at a low temperature for a short period, the distribution of hardness was almost the same throughout the sectional area of a carburized and quenched portion. Thus, it is possible to reduce the costs for carburizing treatment by adopting the conditions defined in the present invention.

TABLE 11-1

| Test No. | Tested Steel (No. in TABLE 4) | Carburizing-quenching Condition Carburizing Temperature (°C.) | Carburizing Time (h) | Hardening Temperature (°C.) | Hardness of Test Piece Surface Hardness (Hv) | Carburized Case Depth (mm) | Core Hardness (Hv) | Tensile Strength (kgf/mm²) |
|---|---|---|---|---|---|---|---|---|
| (1) | ☆49 | *935 | 2 | 870 | *821 | 0.49 | 334 | 104.9 |
| (2) | ☆49 | 920 | 2 | 870 | 799 | 0.45 | 337 | 124.3 |
| (3) | ☆49 | 880 | 2 | 870 | 792 | 0.40 | 335 | 122.1 |

TABLE 11-1-continued

| Test No. | Tested Steel (No. in TABLE 4) | Carburizing Temperature (°C.) | Carburizing Time (h) | Hardening Temperature (°C.) | Surface Hardness (Hv) | Carburized Case Depth (mm) | Core Hardness (Hv) | Tensile Strength (kgf/mm$^2$) |
|---|---|---|---|---|---|---|---|---|
| (4) | ☆49 | 920 | 1 | 870 | 799 | 0.32 | 338 | 123.3 |
| (5) | ☆49 | 920 | 2 | 870 | 789 | 0.45 | 336 | 124.3 |
| (6) | ☆49 | 920 | 3 | 870 | 792 | 0.44 | 337 | 124.0 |
| (7) | ☆50 | 920 | *4 | 870 | 796 | 0.55 | 335 | 103.8 |
| (8) | ☆50 | *935 | 2 | 870 | *816 | 0.49 | 354 | 102.1 |
| (9) | ☆50 | 920 | 2 | 870 | 793 | 0.47 | 346 | 131.4 |
| (10) | ☆50 | 880 | 2 | 870 | 791 | 0.42 | 350 | 127.6 |
| (11) | ☆50 | 920 | 1 | 870 | 791 | 0.36 | 349 | 130.5 |
| (12) | ☆50 | 920 | 2 | 870 | 793 | 0.47 | 346 | 131.4 |
| (13) | ☆50 | 920 | 3 | 870 | 796 | 0.48 | 351 | 132.0 |
| (14) | ☆50 | 920 | *4 | 870 | 799 | 0.57 | 352 | 101.2 |

Note
1) *; Out of Scope of the Invention.
2) Tensile strength was measured by using square pillar-shaped test pieces.

TABLE 11-2

| Test No. | Thermal Deformation (mm) in long side | | | Thermal Deformation (mm) in short side | | |
|---|---|---|---|---|---|---|
| | Max. | Min. | Max. − Min. | Max. | Min. | Max. − Min. |
| (1) | 7.468 | 7.446 | 0.022 | 5.048 | 5.011 | 0.037 |
| (2) | 7.426 | 7.408 | 0.018 | 5.045 | 5.020 | 0.025 |
| (3) | 7.427 | 7.411 | 0.016 | 5.043 | 5.020 | 0.023 |
| (4) | 7.426 | 7.409 | 0.017 | 5.045 | 5.026 | 0.029 |
| (5) | 7.426 | 7.408 | 0.018 | 5.048 | 5.025 | 0.023 |
| (6) | 7.426 | 7.409 | 0.017 | 5.043 | 5.024 | 0.029 |
| (7) | 7.427 | 7.409 | 0.018 | 5.049 | 5.014 | 0.035 |
| (8) | 7.459 | 7.438 | 0.021 | 5.042 | 5.002 | 0.040 |
| (9) | 7.458 | 7.441 | 0.017 | 5.038 | 5.006 | 0.032 |
| (10) | 7.456 | 7.440 | 0.016 | 5.032 | 5.002 | 0.030 |
| (11) | 7.457 | 7.440 | 0.017 | 5.035 | 5.001 | 0.034 |
| (12) | 7.458 | 7.441 | 0.017 | 5.038 | 5.006 | 0.032 |
| (13) | 7.454 | 7.438 | 0.016 | 5.036 | 5.002 | 0.034 |
| (14) | 7.435 | 7.435 | 0.018 | 5.045 | 5.000 | 0.045 |

TABLE 12-2

| Test No. | Thermal Deformation (mm) in long side | | | Thermal Deformation (mm) in short side | | |
|---|---|---|---|---|---|---|
| | Max. | Min. | Max. − Min. | Max. | Min. | Max. − Min. |
| (15) | 7.459 | 7.437 | 0.022 | 5.055 | 5.023 | 0.032 |
| (16) | 7.468 | 7.450 | 0.018 | 5.044 | 5.022 | 0.022 |
| (17) | 7.462 | 7.445 | 0.017 | 5.033 | 5.010 | 0.023 |
| (18) | 7.469 | 7.453 | 0.016 | 5.042 | 5.017 | 0.025 |
| (19) | 7.468 | 7.451 | 0.017 | 5.044 | 5.022 | 0.022 |
| (20) | 7.500 | 7.483 | 0.017 | 5.041 | 5.018 | 0.023 |
| (21) | 7.471 | 7.454 | 0.017 | 5.054 | 5.019 | 0.035 |
| (22) | 7.518 | 7.496 | 0.022 | 5.046 | 5.013 | 0.033 |
| (23) | 7.508 | 7.491 | 0.017 | 5.039 | 5.017 | 0.022 |
| (24) | 7.492 | 7.476 | 0.016 | 5.030 | 5.009 | 0.021 |
| (25) | 7.505 | 7.487 | 0.018 | 5.037 | 5.012 | 0.025 |
| (26) | 7.508 | 7.491 | 0.017 | 5.039 | 5.012 | 0.027 |
| (27) | 7.505 | 7.489 | 0.016 | 5.035 | 5.006 | 0.029 |
| (28) | 7.510 | 7.492 | 0.018 | 5.046 | 5.011 | 0.035 |

TABLE 12-1

| Test No. | Tested Steel (No. in TABLE 4) | Carburizing Temperature (°C.) | Carburizing Time (h) | Hardening Temperature (°C.) | Surface Hardness (Hv) | Carburized Case Depth (mm) | Core Hardness (Hv) | Tensile Strength (kgf/mm$^2$) |
|---|---|---|---|---|---|---|---|---|
| (15) | ☆51 | *935 | 2 | 870 | *827 | 0.47 | 337 | 105.9 |
| (16) | ☆51 | 920 | 2 | 870 | 797 | 0.45 | 336 | 125.4 |
| (17) | ☆51 | 880 | 2 | 870 | 799 | 0.42 | 337 | 104.2 |
| (18) | ☆51 | 920 | 1 | 870 | 799 | 0.34 | 340 | 125.3 |
| (19) | ☆51 | 920 | 2 | 870 | 797 | 0.45 | 336 | 125.4 |
| (20) | ☆51 | 920 | 3 | 870 | 792 | 0.46 | 335 | 125.0 |
| (21) | ☆51 | 920 | *4 | 870 | 796 | 0.57 | 337 | 105.0 |
| (22) | ☆53 | *935 | 2 | 870 | *814 | 0.52 | 358 | 102.3 |
| (23) | ☆53 | 920 | 2 | 870 | 792 | 0.49 | 355 | 131.2 |
| (24) | ☆53 | 880 | 2 | 870 | 799 | 0.46 | 357 | 100.7 |
| (25) | ☆53 | 920 | 1 | 870 | *800 | 0.48 | 360 | 131.3 |
| (26) | ☆53 | 920 | 2 | 870 | *800 | 0.49 | 359 | 131.2 |
| (27) | ☆53 | 920 | 3 | 870 | *800 | 0.49 | 359 | 131.2 |
| (28) | ☆53 | 920 | *4 | 870 | *896 | 0.60 | 360 | 101.4 |
| (29) | Δ54 | 920 | 2 | 870 | *926 | 0.44 | 272 | 117.2 |
| (30) | Δ55 | 920 | 2 | 870 | *914 | 0.39 | 284 | 99.0 |

Note
1) *; Out of Scope of the Invention.
2) Tensile strength was measured by using square pillar-shaped test pieces.

TABLE 12-2-continued

| Test No. | Thermal Deformation (mm) | | | | | |
|---|---|---|---|---|---|---|
| | in long side | | | in short side | | |
| | Max. | Min. | Max. − Min. | Max. | Min. | Max. − Min. |
| (29) | 7.525 | 7.500 | 0.025 | 5.030 | 4.983 | 0.047 |
| (30) | 7.497 | 7.476 | 0.021 | 5.037 | 4.998 | 0.039 |

EXAMPLE 8

Procedure of Example 4 was repeated using steel Nos. 49, 52, and 54 in Table 4, thereby preparing steel pipes. From some steels, steel rods having a diameter of 30 mm were prepared by hot-forging.

Subsequently, using the steel pipes and steel rods, parts of two different sizes constant velocity universal joints for the drive shaft were produced. That is, ball cages and inner races were made using the steel pipes and the steel rods, respectively, on an experimental basis using a machine for mass-production actually working in a factory.

The ball cages and inner races were treated under the carburizing and quenching conditions shown in Table 13, and they were assembled together with other parts to form constant velocity universal joints of a drive shaft.

Using a torsion tester, a torsion force was slowly applied to the thus-created constant velocity universal joints, thereby obtaining a quasi-static torsional fracture strength.

The results obtained as well as the distributions of hardness in sectional areas of the ball cases and inner races are shown in Table 13.

From Table 13, it is understood that irrespective of the size of the constant velocity universal joints, those manufactured under the conditions of the present invention exhibited quasi-static torsional fracture strengths which are 13–14% higher than that of the conventional products, i.e. those which were manufactured under conventional conditions.

quenched, remarkable impact fracture strength, and the manufacture can be performed accurately and consistently.

Also, the present invention facilitates the manufacture of high quality parts of constant velocity universal joints for drive shafts at lower costs.

What is claimed is:

1. A part of a constant velocity universal joint for a drive shaft which is made of a steel consisting of the following elements:

C: 0.1 to 0.25%,
Si: 0.2 to 0.4%,
Mn: 0.3 to 0.9%,
P: 0.02% or less,
S: 0.001 to 0.15%,
Cr: 0.5 to 0.9%,
Mo: 0.15 to 1%,
Al: 0.01 to 0.1%,
B: 0.0005 to 0.009%,
N: less than 0.006%, and the balance of Fe and incidental impurities, wherein % is on a weight basis, the part having a surface hardness (Hv) of 650–800, core hardness (Hv) of 250–450, and carburized layer having a case depth of 0.2–1.2 mm.

2. A part of a constant velocity universal joint for a drive shaft which is made of a steel consisting of the following elements:

C: 0.1 to 0.25%,
Si: 0.2 to 0.4%,
Mn: 0.3 to 0.9%,
P: 0.02% or less,
S: 0.001 to 0.15%,
Cr: 0.5 to 0.9%,
Ni: 0.3–4.0%
Mo: 0.15 to 1%,
Al: 0.01 to 0.1%,
B: 0.0005 to 0.009%,
N: less than 0.006%, and

TABLE 13

| Test No. | Tested CVJ Size ** | Steel (No. in TABLE 4) | Carburizing-quenching Condition | | | Hardness of Test Piece | | | Quasi-static Torsion Strength (kN · m) | | | |
|---|---|---|---|---|---|---|---|---|---|---|---|---|
| | | | Carburizing Temperature (°C.) | Carburizing Time (h) | Hardening Temperature (°C.) | Surface Hardness (Hv) | Carburized Case Depth (mm) | Core Hardness (Hv) | Max. | Min. | Average | Improvement (%)*** |
| (31) | #95 | Δ54 | *935 | *4.0 | 870 | *820 | 0.55 | 277 | — | — | 2.25 | — |
| (32) | #95 | ☆52 | 920 | 3.0 | 870 | 695 | 0.50 | 311 | 2.55 | 2.52 | 2.54 | 13 |
| (33) | #87 | Δ54 | *935 | *4.0 | 870 | *810 | 0.55 | 281 | — | — | 1.80 | — |
| (34) | #87 | ☆49 | 920 | 3.0 | 870 | 700 | 0.50 | 316 | 2.07 | 2.03 | 2.05 | 14 |

Note
1) *; Out of Scope of the Invention.
2) **; Size of the constant velocity universal joint.
3) ***; Increase of strength compared to the conventional product.

As described in detail in the above Examples, the present invention provides carburizing steel exhibiting enhanced strength and wear resistance in carburized portions and having sufficiently improved resistance against fracture loads of impact even when notches are present in carburized portions. The carburizing steel of the invention is advantageously used in the manufacture of steel pipe having excellent workability and exhibiting, after being carburized and the balance of Fe and incidental impurities, wherein % is on a weight basis, the part having a surface hardness (Hv) of 650–800, core hardness (Hv) of 250–450, and carburized case depth of 0.2–1.2 mm.

3. A part of a constant velocity universal joint for a drive shaft which is made of a steel consisting of the following elements:

C: 0.1 to 0.25%,
Si: 0.2 to 0.4%,
Mn: 0.3 to 0.9%,
P: 0.02% or less,
S: 0.001 to 0.15%,
Cr: 0.5 to 0.9%,
Mo: 0.15 to 1%,
Al: 0.01 to 0.1%,
B: 0.0005 to 0.009%,
N: less than 0.006%,
one or more elements selected from the group consisting of Ti, Nb, V and Zr: 0.01–0.3% for each, and the balance of Fe and incidental impurities, wherein % is on a weight basis, the part having a surface hardness (Hv) of 650–800, core hardness (Hv) of 250–450, and carburized case depth of 0.2–1.2 mm.

4. A part of a constant velocity universal joint for a drive shaft which is made of a steel consisting of the following elements:
C: 0.1 to 0.25%,
Si: 0.2 to 0.4%,
Mn: 0.3 to 0.9%,
P: 0.02% or less,
S: 0.001 to 0.15%,
Cr: 0.5 to 0.9%,
Ni: 0.3–4.0%,
Mo: 0.15 to 1%,
Al: 0.01 to 0.1%,
B: 0.0005 to 0.009%,
N: less than 0.006%,
one or more elements selected from the group consisting of Ti, Nb, V and Zr: 0.01–0.3% for each, and the balance of Fe and incidental impurities, wherein % is on a weight basis, the part exhibiting a surface hardness (Hv) of 650–800, core hardness (Hv) of 250–450, and carburized case depth of 0.2–1.2 mm.

5. A method for the manufacture of a part of a constant velocity universal joint for a drive shaft comprising the steps of:
subjecting said part to a carburizing treatment at a temperature between 880° and 930° C. for 1–3 hours, and
quenching the carburized part from a temperature between 800° and 870° C.;
said part being made of a carburizing steel consisting essentially of, in weight %, 0.1 to 0.25% C, 0.2 to 0.4% Si, 0.3 to 0.9% Mn, up to 0.02% P, 0.001 to 0.15% S, 0.5 to 0.9% Cr, 0.15 to 1% Mo, 0.01 to 0.1% Al, 0.0005 to 0.009% B, less than 0.006% N, and the balance Fe and incidental impurities.

6. A method for the manufacture of a part of a constant velocity universal joint for a drive shaft comprising the steps of:
subjecting said part to a carburizing treatment at a temperature between 880° and 930° C. for 1–3 hours, and
quenching the carburized part from a temperature between 800° and 870° C.;
said part being made of a carburizing steel consisting essentially of, in weight %, 0.1 to 0.25% C, 0.2 to 0.4% Si, 0.3 to 0.9% Mn, up to 0.02% P, 0.001 to 0.15% S, 0.5 to 0.9% Cr, 0.3 to 4.0% Ni, 0.15 to 1% Mo, 0.01 to 0.1% Al, 0.0005 to 0.009% B, less than 0.006% N, and the balance Fe and incidental impurities.

7. A method for the manufacture of a part of a constant velocity universal joint for a drive shaft comprising the steps of:
subjecting said part to a carburizing treatment at a temperature between 880° and 930° C. for 1–3 hours, and
quenching the carburized part from a temperature between 800° and 870° C.;
said part being made of a carburizing steel consisting essentially of, in weight %, 0.1 to 0.25% C, 0.2 to 0.4% Si, 0.3 to 0.9% Mn, up to 0.02% P, 0.001 to 0.15% S, 0.5 to 0.9% Cr, 0.15 to 1% Mo, 0.01 to 0.1% Al, 0.0005 to 0.009% B, less than 0.006% N, 0.01 to 0.3% for each of one or more elements selected from the group consisting of Ti, Nb, V and Zr, and the balance Fe and incidental impurities.

8. A method for the manufacture of a part of a constant velocity universal joint for a drive shaft comprising the steps of:
subjecting said part to a carburizing treatment at a temperature between 880° and 930° C. for 1–3 hours, and
quenching the carburized part from a temperature between 800° and 870° C.;
said part being made of a carburizing steel consisting essentially of, in weight %, 0.1 to 0.25% C, 0.2 to 0.4% Si, 0.3 to 0.9% Mn, up to 0.02% P, 0.001 to 0.15% S, 0.5 to 0.9% Cr, 0.3 to 4.0% Ni, 0.15 to 1% Mo, 0.01 to 0.1% Al, 0.0005 to 0.009% B, less than 0.006% N, 0.01 to 0.3% for each of one or more elements selected from the group consisting of Ti, Nb, V and Zr, and the balance Fe and incidental impurities.

9. The part as defined in claim 1, wherein the carburizing steel is Ti-free.

10. The part as defined in claim 1, wherein Cr is 0.5 to 0.65%.

11. The part as defined in claim 1, having an ultimate tensile strength of over 120 kgf/mm$^2$.

12. The part as defined in claim 1, having a rolling contact fatigue strength of at least 300 kg/mm$^2$.

13. The part as defined in claim 1, wherein Mo is present in an amount which elevates C content of the carburized layer, Cr is present in an amount which prevents embrittlement of grain boundaries and N is present in an amount which prevents precipitation of carbides on the grain boundaries.

* * * * *